United States Patent [19]
Blaner et al.

[11] Patent Number: 5,287,467
[45] Date of Patent: Feb. 15, 1994

[54] PIPELINE FOR REMOVING AND CONCURRENTLY EXECUTING TWO OR MORE BRANCH INSTRUCTIONS IN SYNCHRONIZATION WITH OTHER INSTRUCTIONS EXECUTING IN THE EXECUTION UNIT

[75] Inventors: Bartholomew Blaner, Newark Valley; Thomas L. Jeremiah, Endwell; Stamatis Vassiliadis; Phillip G. Williams, both of Vestal, all of N.Y.

[73] Assignee: International Business Machines Corporation, Armonk, N.Y.

[21] Appl. No.: 687,309

[22] Filed: Apr. 18, 1991

[51] Int. Cl.$^5$ ............................................. G06F 9/38
[52] U.S. Cl. .................. 395/375; 364/231.8; 364/261.3; 364/261.5; 364/261.7; 364/263; 364/263.1; 364/DIG. 1; 364/948.34; 364/938; 364/938.1; 364/938.2; 364/948
[58] Field of Search .............................. 395/375, 800

[56] References Cited

U.S. PATENT DOCUMENTS

| | | | |
|---|---|---|---|
| 3,764,988 | 10/1973 | Onishi | 395/375 |
| 4,766,566 | 8/1988 | Chuang | 395/375 |
| 4,827,402 | 5/1989 | Wada | 395/375 |
| 4,833,599 | 5/1989 | Colwell et al. | 395/650 |
| 4,853,840 | 8/1989 | Shibuya | 395/375 |
| 5,075,844 | 12/1991 | Jardine et al. | 395/375 |
| 5,081,574 | 1/1992 | Larsen et al. | 395/375 |
| 5,101,344 | 3/1992 | Bonet et al. | 395/375 |
| 5,142,634 | 8/1992 | Fite et al. | 395/375 |
| 5,185,868 | 2/1993 | Tran | 395/375 |
| 5,197,136 | 3/1993 | Kimura et al. | 395/375 |

Primary Examiner—Thomas C. Lee
Assistant Examiner—Paul Harrity
Attorney, Agent, or Firm—Lynn L. Augspurger

[57] ABSTRACT

The parallelism of a multi-pipelined digital computer is enhanced by detection of branch instructions from the execution pipelines and concurrent processing of up to two of the detected instructions in parallel with the operations of the execution pipelines. Certain branch instructions, when detected, are removed altogether from the pipeline, but still processed. The processing is synchronized with the execution pipeline to, first, predict an outcome for detected branch instructions, second, test the conditions for branch instructions at their proper place in the execution sequence to determine whether the predicted outcome was correct, and third, fetch a corrected target instruction if the prediction proves wrong.

19 Claims, 11 Drawing Sheets

| INSTRUCTION | | % OF TRACE | % OF BRANCH | % TAKEN | % NOT TAKEN | LENGTH (hfwd) |
|---|---|---|---|---|---|---|
| BC | $M_1,D_2(X_2,B_2)$ | 17.23 | 68.6 | 54.3 | 45.7 | 2 |
| BCT | $M_1,D_2(X_2,B_2)$ | 2.213 | 8.8 | 95.4 | 4.6 | 2 |
| BCR | $R_1,R_2$ | 2.013 | 8.0 | 91.9 | 8.1 | 1 |
| BAL | $R_1,D_2(X_2,B_2)$ | 0.964 | 3.8 | 100 | 0 | 2 |
| BALR | $R_1,R_2$ | 0.747 | 3.0 | 62.3 | 37.7 | 1 |
| BSM | $R_1,R_2$ | 0.548 | 2.2 | 100 | 0 | 1 |
| BCTR | $R_1,R_2$ | 0.434 | 1.7 | 0 | 100 | 1 |
| EX | $R_1,D_2(X_2,B_2)$ | 0.351 | 1.4 | – | – | 2 |
| BASR | $R_1,R_2$ | 0.326 | 1.3 | 62.3 | 37.7 | 1 |
| BAS | $R_1,D_2(X_2,B_2)$ | 0.137 | 0.55 | 100 | 0 | 2 |
| BASSM | $R_1,R_2$ | 0.115 | 0.46 | 100 | 0 | 1 |
| BXLE | $R_1,R_3,D_2(B_2)$ | 0.026 | 0.10 | 57.4 | 42.6 | 2 |
| BXH | $R_1,R_3,D_2(B_2)$ | 0.0004 | << 0.01 | 65.7 | 34.3 | 2 |

| INSTR | OpCODE | FORMAT | CATEGORY I PRED: NOT TAKEN NO PRE-FETCH | CATEGORY II PRED: TAKEN REGISTER AGen | CATEGORY III PRED: BTB BTB AGen |
|---|---|---|---|---|---|
| BALR | 05 | RR | (R$_2$=0) | (R$_2$≠0) | |
| BAL | 45 | RX | | | always |
| BASR | 0D | RR | (R$_2$=0) | (R$_2$≠0) | |
| BAS | 4D | RX | | | always |
| BASSM | 0C | RR | (R$_2$=0) | (R$_2$≠0) | |
| BSM | 0B | RR | (R$_2$=0) | (R$_2$≠0) | |
| BCR | 07 | RR | (m=0 or R$_2$=0) | (m=F) | (m≠0orF & R$_2$≠0) |
| BC | 47 | RX | (m=0) | | (m≠0) |
| BCTR | 06 | RR | (R$_2$=0) | | (R$_2$≠0) |
| BCT | 46 | RX | | | always |
| BXH | 86 | RS | | | always |
| BXLE | 87 | RS | | | always |
| EX | 44 | RX | | | always |

*FIG. 6*

| PIPELINE CLOCK PERIOD | 1 | 2 | 3 | 4 | 5 | 6 | 7 | 8 | 9 | 10 | 11 |
|---|---|---|---|---|---|---|---|---|---|---|---|
| Br a | fet | BD | BQ | AG | BT | | | | | | |
| Br b | fet | | BD | BQ | AG | BT | | | | | |
| BC Instr | fet | | | BD | BQ/AG | BT | | | | | |
| Br d | | | | | fet | BD | BQ | AG | BT | | |
| Br e | | | | | fet | | BD | BQ | AG | BT | |
| END_OP | —a— | —b— | | | | —d— | —e— | | | | |
| BR_ID | —a— | —b— | | | | —d— | —e— | | | | |
| BR_AG | | —a— | —b— | | | —d— | —e— | | | | |
| BR_EX | | | —a— | —b— | | | —d— | —e— | | | |
| BC_ID | | | | | | | | | | | |
| BC_AG | | | | | | | | | | | |
| DEQUE_AG_ULPTR | | | | | | | | | | | |
| AG_INCR_AMT(0:1) | | | | '01' | '10' | | | '01' | '01' | | |
| BQ_AG_ULPTR_ | '00' | '00' | '00' | '00' | '01' | '11' | '11' | '11' | '00' | '01' | '01' |
| BQ_AG_ULPTR_ | '01' | '01' | '01' | '01' | '10' | '00' | '00' | '00' | '01' | '10' | '10' |
| DEQUE_BT_ULPTR | | | | | | | | | | | |

*FIG. 13*

PIPELINE FOR REMOVING AND CONCURRENTLY EXECUTING TWO OR MORE BRANCH INSTRUCTIONS IN SYNCHRONIZATION WITH OTHER INSTRUCTIONS EXECUTING IN THE EXECUTION UNIT

CROSS-REFERENCE TO RELATED APPLICATIONS

The present United States Patent Application is related to the following co-pending United States Patent Applications:

(1) Application Ser. No. 07/519,382 filed May 4, 1990 now abandoned, continued as 08/013,982, filed Feb. 5, 1993 still pending, entitled "Scalable Compound Instruction Set Machine Architecture", the inventors being Stamatis Vassiliadis et al;

(2) Application Ser. No. 07/519,384 filed May 4, 1990 now abandoned, continued as 08/013,982, filed Feb. 5, 1993, still pending entitled "General Purpose Compound Apparatus for Instruction-Level Parallel Processors", the inventors being Richard J. Eickemeyer et al;

(3) Application Ser. No. 07/504,910 filed Apr. 4, 1990, now U.S. Pat. No. 5,051,940, entitled "Data Dependency Collapsing Hardware Apparatus", the inventors being Stamatis Vassiliadis et al;

(4) Application Ser. No. 07/522,291, filed May 10, 1990 now U.S. Pat. No. 5,214,763, entitled "Compounding Preprocessor for Cache", the inventors being Bartholmew Blaner et al;

(5) Application Ser. No. 07/543,464, filed June 26, 1990 still pending, entitled "An In-Memory Preprocessor for a Scalable Compound Instruction Set Machine Processor", the inventors being Richard J. Eickemeyer et al;

(6) Application Ser. No. 07/543,458, filed Jun. 26, 1990, now U.S. Pat. No. 5,197,135, entitled "Memory Management for Scalable Compound Instruction Set Machines with In-Memory compounding", the inventors being Richard J. Eickemeyer et al;

(7) Application Ser. No. 07/619,868, filed Nov. 28, 1990, still pending, entitled "Overflow Determination for Three-Operand ALUS in a Scalable Compound Instruction Set Machine", the inventors being Stamatis Vassiliadis et al;

(8) Application Ser. No. 07/642,011, filed Jan. 15, 1991, still pending, entitled "Compounding Preprocessor for Cache", the inventors being B. Blaner et al. (A continuation-in-part of U.S. Patent Application Ser. No. 07/522,291, filed May 10, 1990).

(9) Application Ser. No. 07/653,006, filed Feb. 8, 1991, still pending, entitled "Microcode Generation for a Scalable Compound Instruction Set Machine", the inventor being Thomas L. Jeremiah.

These co-pending applications and the present application are owned by one and the same assignee, namely, INTERNATIONAL BUSINESS MACHINES CORPORATION of Armonk, New York.

The descriptions set forth in these co-pending applications are hereby incorporated into the present application by this reference thereto.

BACKGROUND OF THE INVENTION

This invention concerns the operation of digital computers, and is particularly directed to the processing of branching instructions in a digital computer employing pipelined instruction processing.

Branch instructions can reduce the speed and efficiency of pipelined instruction processing. This deleterious effect has an even greater impact on the performance of processors with multiple pipelines processing a single instruction stream. Such processors include those referred to as "scalable compound instruction-set machines" (SCISM). A machine with SCISM architecture is taught in detail in the cross-referenced patent applications.

Branch prediction schemes have been proposed to reduce the performance penalty extracted by branch instruction execution. Two such schemes are of interest. The first involves dynamic prediction of branch outcomes by tagging branch instructions in an instruction cache with predictive information regarding their outcomes. See, for example, the article by J.E. Smith entitled "A Study of Branch Prediction Strategies", in the March 1981 PROCEEDINGS of the Eighth Annual Symposium on Computer Architecture. SCISM architecture which provides spare information capacity in an instruction stream is particularly adapted for this scheme. In this regard, a bit, called a "compounding" or "C"-bit, is provided in every half word of a SCISM instruction stream. Whenever one of these bits follows an instruction which can be executed in parallel with ("compounded with") the following instruction, the C-bit in the first halfword of the first instruction is set to indicate this capability. If the instruction is longer than one-half word, the compounding provides unused bits for the extra halfwords. The C-bit or bits which are not used in the compounding scheme are available for alternate uses. For branch instructions, one such use is the prediction of the outcome of a branch instruction.

A second branch prediction strategy involves the use of a branch target buffer (BTB) which contains a history of the outcome of executed branch instructions. When a branch instruction is first executed, its outcome is stored in the BTB. When the branch instruction is executed a second time, its predicted outcome is the outcome stored in the BTB. Such a mechanism is described in detail in the article by J.K.F. LEE ET AL, entitled "Branch Prediction Strategies in Branch Target Buffer Design" in the January 1984 issue of IEEE COMPUTER.

While both dynamic prediction and branch target buffer mechanisms do speed up a pipeline which executes an instruction stream including branch instructions, the techniques involved have not been adapted for application in a SCISM architecture. Further, the advantages of parallelism enjoyed in multiple-pipeline architectures have not yet been realized in processing branch instructions.

SUMMARY OF THE INVENTION

The invention is based upon the inventors' critical observation that branch instructions which do not require execution unit operations can be extracted from an executing instruction stream and held for branch condition testing in synchronism with execution of the execution stream.

A significant objective of this invention, is, therefore, to increase the parallelism of digital computers with multiple execution pipelines.

This objective, and other significant objectives and advantages, are achieved in a digital computing machine which includes an instruction source, an execution pipeline for executing a stream of instructions, and a condition code determination mechanism connected to the instruction pipeline for providing condition signals indicating results of executed instructions. In this context, the invention is a combination for processing branch instruction conditions, and the combination includes:

an instruction issue mechanism coupled to the instruction source and to the execution pipeline for providing a sequence of instructions for pipelined execution; and a branch condition processor for:

removing branch instructions from the sequence of instructions; and in response to the condition indication signals, executing removed branch instructions substantially in parallel with execution of instructions by the execution pipeline.

BRIEF DESCRIPTION OF THE DRAWINGS

The achievement of this invention's objectives can be understood with reference to the detailed description of the preferred embodiments of the invention and to the drawings, in which:

FIG. 6 is a table showing three prediction categories for a set of branch instructions;

FIG. 13 is a timing diagram illustrating the operation of the invention.

DETAILED DESCRIPTION OF THE PREFERRED EMBODIMENTS

Figure 1:
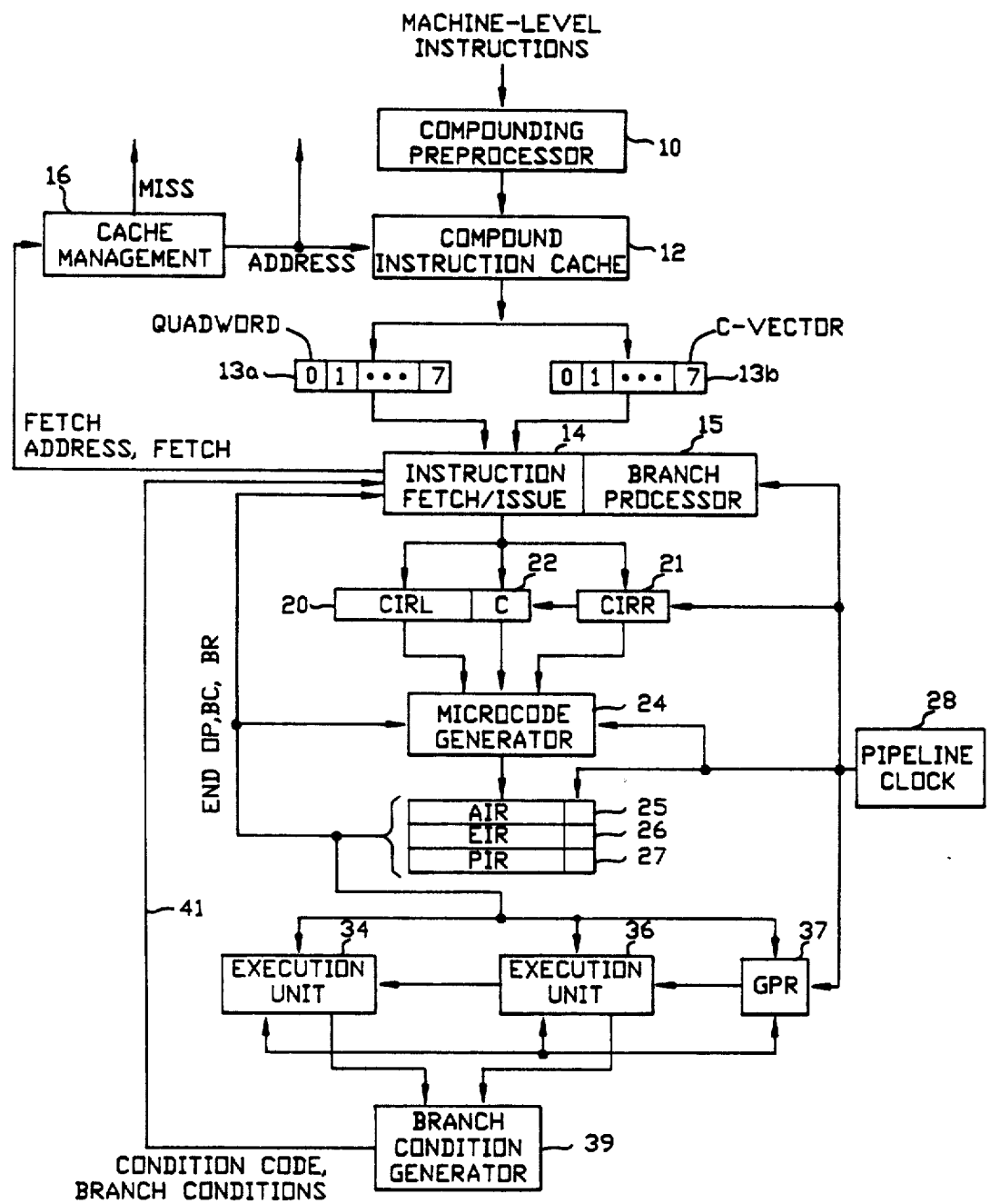
FIG. 1 is a block diagram with a multiple pipeline, scalable compound instruction set machine (SCISM)

FIG. 1 illustrates a SCISM architecture in which microprogramming is used to implement and control the execution of machine-level instructions singly or in pairs. In particular, a machine-level instruction stream is provided to a compounding preprocessor 10. The instruction stream is a sequence of individual instructions which have typically been compiled from a source program. The stream is provided to the CPU of a SCISM computer for execution. Conventionally, the machine-level instructions are staged into the CPU through a cache (compound instruction cache) 12. Before entry into the cache, the instruction stream is examined by the compounding preprocessor 10 to determine whether adjacent instructions can be concurrently executed. The compounding preprocessor 10 is described in detail in the eighth referenced co-pending U.S. Patent Application, entitled "COMPOUNDING PREPROCESSOR FOR CACHE" also described in the referenced application is the structure of a compounding instruction cache which functions as a cache 12 of FIG. 1.

The operation of the compounding preprocessor 10 results in the generation of compounding information indicating whether adjacent instructions of the compiled instruction stream which have been cached at 12 can be concurrently executed. Thus, for each instruction, the compounding preprocessor 10 generates compounding information indicating whether that instruction and an adjacent instruction can be executed in parallel.

Following processing by the compounding preprocessor 10, the analyzed instructions and the compounding information are stored in the compounding instruction cache 12. Except for the provision of extra space to store the compounding information, it is asserted that the cache 12 is operated conventionally. In particular, entries in the cache 12 are typically groups of adjacent instructions ("lines") which are entered into the cache so that they can be quickly obtained as required by an executing program.

In providing the compounding information together with instructions in the cache 12, the SCISM architecture takes fuller advantage of parallelism than a computer which makes the parallel execution decision when instructions are brought out of the cache for immediate execution ("issued"). Relatedly, an instruction in the cache 12 may be used more than once in, for example, a loop or branch. So long as the instruction is in the cache, it does not have to be reanalyzed if obtained again for execution because the compounding information for the instruction which is stored with it in the cache can be reused.

The compounding preprocessor 10 is assumed to be of the type described in the referenced patent application and generates, for each instruction, at least one C-bit. These C-bits are used to identify which pairs of instructions may be processed in parallel. Instructions and their C-bits are supplied and stored into the compound instruction cache 12. An instruction fetch and issue unit 14 fetches the instructions and their C-bits from the compound instruction cache 12, as needed, and arranges for their execution by the appropriate one or ones of a plurality of execution units 34, 36.

The information fetched from the cache 12 includes instruction text and associated compounding information. Each fetch is in the form of a quadword (that is, a four-word line) as indicated by reference numeral 13a and includes eight halfwords numbered 0, 1, ... 7. Associated with each quadword of instruction text is a 1×8 array of C-bits comprising the compounding information produced by the compounding preprocessor 10. The bits are referred to as a "C-vector".

Figures 2, 3:
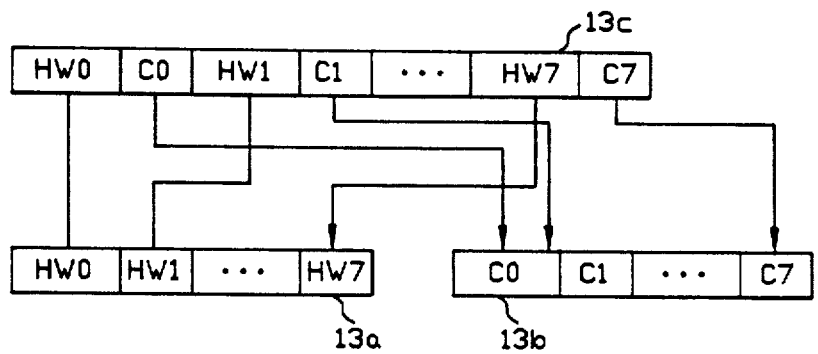
FIG. 2 is a schematic drawing of compounded instruction formats showing two arrangements for providing compounding information with compounded instructions.
FIG. 3 is a chart showing the statistics of branch instructions in a model instruction trace.

FIG. 2 is a more detailed illustration of the results of the operation of the compounding preprocessor 10. If it is assumed that the structure of FIG. 1 is included in a digital computer of the System/370 type available from the assignee, then it will be realized that the instruction stream includes instructions which can vary in length from one to three halfwords. For operational efficiency, the preprocessor 10 generates a C-bit for every halfword stored in the cache. The C-bit for the first halfword of an instruction is conditioned to indicate whether the following instruction is to be executed in parallel with the instruction. A set C-bit associated with the first halfword of an instruction indicates that the instruction has been "compounded" with the following instruction and that the two instructions are to be executed in parallel. Otherwise, the instructions are executed singly.

Instructions and associated compounded information are fetched from the cache 12 by an instruction fetch and issue unit 14 which includes a branch processing unit 15. Control information for instruction fetching is fed in the form of a signal FETCH which is conditioned to indicate that a quadword of instruction text is to be obtained from the cache 12 and provided to the instruction fetch and issue unit 14. When the signal is conditioned to indicate a fetch, it is accompanied by a fetch address of the next instruction to be processed by the instruction fetch and issue unit 14 for execution. In this regard, the fetch address could be the address of the next instruction in the portion of the instruction sequence following an instruction in the fetch and issue unit 14. The fetch address could also be an address in the instruction sequence which is pointed to by an executed branch instruction. In any event, the FETCH and fetch address are provided to a cache management mechanism 16 which maps the fetch address to a cache address if the instruction is in cache or which provides the address to a real memory management mechanism together with a MISS indication if the instruction is not in the cache.

In the description which follows, it is assumed that the SCISM architecture supports the simultaneous execution of pairs of instructions in the sequence of machine-level instructions provided by way of the preprocessor 10 and cache 12 through the instruction fetch and issue unit 14. Relatedly, a compound instruction register including left and right portions receives issued instructions and positions them for single or parallel execution. The instruction which is next to be executed is entered by the instruction fetch and issue unit 14 into the left-hand compound instruction register (CIRL) 20 which includes register portion 22 for storage of the C-bit which indicates compounding for the instruction. If the C-bit is conditioned to indicate that the instruction in the CIRL 20 is to be executed with the immediately following instruction, that instruction is placed by the fetch and issue unit into the right-hand compound instruction register (CIRR) 21. On the other hand, if the C-bit indicates that the instruction in the CIRL 20 is not compounded with the following instruction, and the contents of the CIRR 21 are disregarded.

A microcode generator 24 translates the contents of the compound instruction registers into microcode which is staged through an execution pipeline consisting of an address generation instruction register (AIR) 25, an execution instruction register (EIR) 26, and a put-away instruction register (PIR) 27. Instruction fetch and issue unit 14, compound instruction registers 20 and 21, microcode generator 24, and lower pipeline stages 25-27 form an instruction execution pipeline which is synchronized by a pipeline clock provided by a pipeline clock generator 28.

The sequence of operations used in the SCISM architecture to execute machine-level instructions is partitioned into five pipelined stage, with the intent of feeding subsequent instructions into the pipeline each cycle of the pipeline clock. The first stage, IF, is instruction fetch which occurs when an instruction is fetched from the cache 12 or from an instruction buffer residing in the fetch and issue unit 14. At the end of the IF cycle, the instruction is ready to be loaded into the compound instruction registers where it will be decoded to start instruction execution. If the C-bit of the instruction indicates that the next following instruction is to be executed in parallel with the current instruction, both instructions are available at the end of the IF cycle, with the first instruction and the C-bit being available for loading into the CIRL 20 and the following instruction into the CIRR 21. The instruction decode (ID) cycle is controlled by logic decoding of CIRL and CIRR 20 and 21, respectively. The generation of the first microword needed to control subsequent stages of the pipeline occurs in this cycle and consists of accessing a control store included in the microcode generator 24 using instruction op codes as microword addresses. The address generation (AG) cycle is used to calculate an effective address for operands needed from storage. The execution (EX) cycle is used to do operations in one or more execution units. The put-away (PA) cycle is used to store results from the EX cycle into the general purpose registers (GPR) 37.

As the ninth-referenced patent application teaches, the microcode generator 24 consists of a main control store (MCS) and a secondary control store (SCS) to form a merged microinstruction. During the ID cycle, the contents of the CIRL 20 are used to address the MCS. If the C-bit in register field 22 indicates that the CIRR 21 contains an instruction which is compounded with that contained in the CIRL 20, the op code of the instruction in the CIRR is gated by the C-bit to address the SCS. The microinstruction output by the microcode generator 24 contains all the fields necessary for controlling the execution of two instructions in parallel. Certain of the fields of the microinstruction are reserved for execution of the first instruction, while certain other fields are reserved for execution of the second instruction. If only a single instruction is presented to the microcode generator 24, that instruction is resident in the CIRL 20 and results in generation of a microinstruction sequence in which the fields for execution of a second instruction are set to default values, while the fields for the first instruction are appropriately set to execute it. If instructions are contained in the CIRL 20 and CIRR 21, the output of the SCS is merged with the output of the MCS by entering into the second fields the information output from the SCS.

The microinstruction sequences output by the microcode generator 24 are fed to the last three pipeline stages 25-27. In the pipeline, conventional horizontal microcode execution is undertaken by generation of controls at each stage of the pipeline which operate either the execution unit 34 or the execution units 34 and 36 for conventional instruction execution with operands and results transferred between the execution units and the GPR 37. In addition, pipelined sequence controls including an END OP bit signifying the end of a microinstruction sequence are fed back to the instruction fetch and issue unit in order to maintain the sequence of instructions fed to the compound instruction registers.

In the operation of the invention, two additional control signals (also "tokens"), BC and BR, are fed back to the branch processor 15 from the execution pipeline 25-27 for control of operations which are explained below.

The results of instruction execution are provided from the execution unit 34 if a single instruction is executed, or from the execution units 34 and 36 if a pair of instructions are executed to a branch condition generator 39. The branch condition generator operates conventionally to generate a condition code (CC) and other branch conditions resulting from execution of branch instructions. These condition signals are conducted from the branch condition generator 39 on the pathway 41 back to the branch processor 15 for use which is described below.

BRANCH INSTRUCTION EFFECTS

The technique of pipelined instruction processing is widely known and employed in computer design, offering a manifold performance acceleration if conditions conducive to pipelining can be met and sustained. This benefit is compounded in the SCISM architecture illustrated in FIG. 1 by provision of a pipeline structure which operates a pair of pipelines in the event that two instructions are to be executed in parallel. Unfortunately, the characteristics of program behavior are such that the conditions for pipelining frequently go unmet, thus reducing the speedup actually attained when pipelining is employed.

A primary inhibiting characteristic is a comparatively high frequency of branch instructions found in programs. Up to 25% or more of all instructions executed in a given program may comprise branch instructions. Branch instructions disrupt pipeline operations by introducing unused cycles into a pipeline when a decision must be made, based on a prior or coincident execution result, to either fetch a new (target) instruction stream or continue executing the current instruction stream in sequence. Delay in making the decision and fetching the appropriate stream introduces more unused cycles and further diminishes the performance achieved by pipelining.

The performance-diminishing effect of branch instructions is amplified in the SCISM architecture exemplified in FIG. 1. Execution of multiple instructions in parallel from a single instruction stream makes the executing machine particularly susceptible to the adverse effects of branches, because not only will branch instructions cause multiple pipelines to stall, but since the SCISM architecture consumes instructions between branches at a higher rate, at any instant in time, the likelihood of a branch instruction entering the pipelines is greater than otherwise.

More particularly, the presence of a branch instruction in a pipeline raises the uncertainty of the address of the instruction following the branch instruction. Ideally, instructions are executed in a continuous sequence which enables the address of the next instruction to be determined simply by adding the length of the current instruction to its address. This is termed "sequential addressing". The address of the next instruction following the branch instruction may be called the "sequential address". Alternatively, execution of a branch instruction may result in movement of programming execution to a nonsequential instruction address. This address is termed "branch target address". Whether a sequential address or a branch target address follows the address of the branch instruction depends upon the outcome of a test which is implicit in the branch instruction. If the test conditions are met, the instruction stream branches to the branch target instruction; if the branch conditions are not met, the next address following the branch instruction is the sequential address.

In pipelined instruction execution, the uncertainty inherent in a branch test can be met by preventing the issuance of any instructions until the branch test is completed, upon which the correct address can be determined and the corresponding instruction fetched. However, this introduces a delay in the pipeline following every branch instruction. Alternatively, the outcome of a branch can be predicted and the predicted instruction can be fetched and placed in the pipeline immediately following the branch instruction.

If the predicted outcome of a branch instruction is that the branch is not taken, instruction fetching can proceed in the normal fashion simply by incrementing the address of the branch instruction by its length and issuing the next following instruction. Provision of an instruction buffer in an instruction fetch and issue unit utilizes the updated address to validate the sequential contents of the buffer which includes the instruction sequence following the branch instruction in the stream. Alternatively, if the branch target address is predicted as the outcome, the buffer must be cleared and a sequence of instructions beginning at the predicted branch target address must be "prefetched" from a cache and placed into the instruction buffer of the fetch and issue unit.

If, after execution of the branch instruction, the outcome of the branch test indicates that the incorrect prediction has been made, the contents of the instruction buffer must be cleared and a "refetch" of the correct instruction sequence must be brought into the buffer.

The bit-prediction and branch target buffer mechanisms mentioned in the Background hereinabove are the two principal mechanisms for dynamically predicting the outcome of a branch instruction.

In the first mechanism, any cached branch instruction is accompanied in a cache by one or more bits which are used to predict the outcome of the instruction. In this regard, the information is conditioned to indicate the last outcome of the branch instruction.

In the second mechanism, a table ("branch target buffer") is maintained apart from the instruction cache in which the history of recently executed branch instructions is maintained. Preferably, the addresses of the branch instructions in the cache are used to address a branch target buffer which has, for each cached branch instruction, a record of its last outcome and the branch target address. For branches which have not been executed but which are cached, a predetermined outcome, based on a statistical profile of the branch instruction in the same or similar programs, is made for the instruction when it is first brought from the cache for instruction issue. These mechanisms and strategies for implementing them are considered in detail in the articles by Smith and Lee et al referenced above.

In SCISM architecture where instructions may include one or more unused compounding bits, the unused bits may be used advantageously for predicting the outcome of the branch instructions. Thus, for any branch instruction which includes two or more halfwords, the extra bit or bits produced by the compounding preprocessor are stored with the instruction and cache and can be used for predicting the outcome of the instruction. Preferably, the rules implemented by the compounding preprocessor for determining whether instructions are to be compounded would not compound single halfword branch instructions, thereby freeing the single C-bit for service in branch outcome prediction.

The table of FIG. 3 lists branch instructions for the extended system architecture (ESA) version of the System/370 digital computer product available from the assignee. These instructions, their formats, their functions, and their tests can all be understood with reference to, for example, the book by C.J. Kacmar entitled IBM 370 ASSEMBLY LANGUAGE WITH ASSIST, Prentis Hall, 1988, especially chapter 6. The table of FIG. 3 also gives, for a representative instruction trace, the frequencies of the System/370 branch instructions relative to all instructions, their frequencies relative to branch instructions only, their frequencies of taken and not taken branches, and their lengths in half words. For example, the BC instruction constitutes 17.23% of the instructions of the representative trace and constitutes 68.6% of all branching instructions in the trace.

BRANCH INSTRUCTION ISSUE PROCESSING

The invention concerns the processing of branch instructions in the central processing unit (CPU) of a computer which includes multiple parallel pipelines for executing instructions either singly or in parallel. The inventors have made the critical observation that parallelism of such a CPU can be enhanced by removing from its pipeline branch instructions which require no execution unit operation, but which only test conditions created by execution of previous instructions. Condition testing for these instructions is accomplished in correct synchronism with the execution of other instructions by advancing indication signals in the execution pipeline of the CPU. All other branch instructions are entered into the pipeline, where their locations are tracked with similar indication signals. Provision of a multiple pipeline raises the possibility that the conditions of more than one branch instruction can be tested in the same pipeline cycle, thereby extending inherent parallelism of multiple pipeline architecture which underpins parallel instruction execution.

Figure 4:
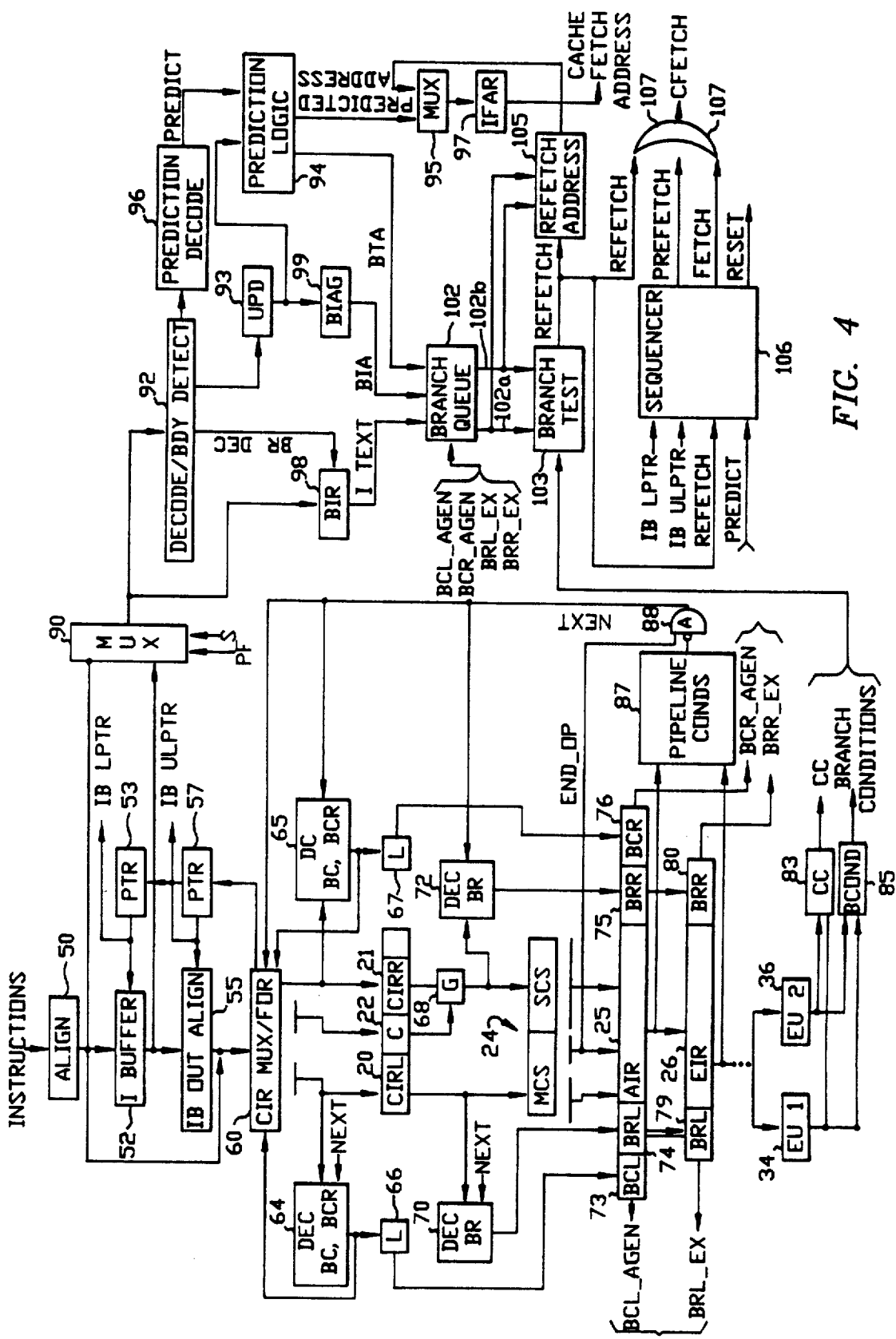
FIG. 4 is a general block diagram of an instruction fetch and issue unit and branch processing unit in the SCISM architecture of FIG. 1.

The invention is practiced in the branch processing unit 15 of the instruction fetch and issue unit which is illustrated in an environmental context in FIG. 1 and which is presented in greater detail in FIG. 4, together with portions of the execution pipeline. All storage elements of these units, including registers, pointers, and state machines change their outputs in response to the pipeline clock.

In FIG. 4, the instruction fetch and issue unit 14 provides the pipelined execution circuitry with a stream of instructions for processing. Interruption of the stream is reduced by predicting the outcome of branch instructions and prefetching the predicted stream into an instruction buffer (IB). The prefetched instructions are fed to the execution pipeline for execution until the true outcome of the branch instruction can be determined. At this point, if the branch direction was predicted incorrectly, execution of the prefetched stream can be cancelled. In the case of a misprediction or incorrect branch target address, the correct instruction will be fetched into the decode stage of the execution pipeline and the following instructions will be fetched into the IB.

The instruction fetch and issue unit, indicated by reference numeral 14 in FIG. 4, consists of an alignment unit (ALIGN) 50, an instruction buffer 52, an instruction buffer output aligner 55, and a multiplexer/formatter unit 60 provided for multiplexing and formatting instructions for placement in the compound instruction registers.

Instruction fetch and issue unit 14 issues instruction fetches to the cache management unit 16, providing a FETCH signal and a fetch address. Each fetch address addresses four contiguous words (a "quadword") and their associated C-bits. The quadword and associated C bits are provided to the alignment unit 50 where the text is rotated to align the 1st halfword fetched to the left boundary. This aligner output is sent directly to the CIR formatter 60 for possible destination to the CIR registers 20 and 21. The same text is then rotated to the right based on the current IB load pointer 53 value. This completes the text alignment functions and allows the first halfword from the fetch to be gated into the first available IB register 52 location, and the remaining halfwords to be entered into the remaining available locations. As is known, in the IBM System/370 instruction set, the instruction format provides, in the first two bits of the instruction OP code, the length of the instruction in half words. Thus, as the first instruction is aligned with a reference point, its length code gives the location of the beginning of the following instruction.

The registers of the instruction buffer 52 are not illustrated in FIG. 4, it being assumed that the instruction buffer is of conventional design and is loaded under control of a load pointer 53. The load pointer is a cycling counter which is incremented each time an instruction is loaded into a register of the IB to point to the next available register.

Unloading of the IB registers 52 is by way of the instruction buffer output aligner 55 under control of an unloader 57. The output aligner 55 rotates IB instruction text being pointed to by the output pointer 57 leftward to a boundary. Beginning from the boundary, five half words of instruction text along with corresponding C-bits are sent to the CIR multiplexer/formatter 60 for formatting, the final destination being the compound instruction registers 20 and 21.

The CIR multiplexer/formatter 60 receives the five half words of the instruction text with the purpose of producing up to two instructions for registration in the compound instruction registers 20 and 21. In addition to the instruction text, the multiplexer/formatter also receives a C-bit for each half word. The formatting portion of the unit then inspects the length of the first instruction, along with the controlling C-bit. If the controlling C-bit for the instruction indicates that it is compounded with the next following instruction, that instruction is loaded into the CIRR 21. Preferably, the "controlling" C-bit for an instruction is the C-bit associated with the first halfword of an instruction.

The CIR multiplexer/formatter 60 can be sourced from either the alignment unit 50 or the output aligner 55, depending upon whether the instruction buffer is empty or not. If empty, the first five halfwords of the fetched quadword are forwarded to the multiplexer/formatter directly from the alignment unit 50 while the remaining half words are fed to the IB. This avoids delay in filling the pipeline during an initial fetch of instructions or during a refetch which clears the pipeline.

Preferably, the IB 52 is one and one-half quadwords in length and contains prefetched instruction text. The text may not be from sequential storage locations as the branch processor may prefetch target streams of instructions for branches predicted to be taken. These branch target streams will be loaded into the IB at their logical execution points, overwriting the sequential instruction stream that may have been there. Two pointers are associated with the IB 52, the load pointer 53, and the unload pointer 57.

The load pointer 53 is a circular counter whose value is incremented each time new text is loaded into the IB 52. For branch target loading of the IB 52, the load pointer value is set to point at the halfword of instruction text following the branch instruction that initiated the target fetch. The count of the load pointer 53 is given by the signal IBLPTR.

The unload pointer 57 always points to an instruction boundary in the IB 55 and will be advanced by an amount equal to the length of instruction text loaded into the compound instruction registers. Advancing of the value of the pointer will be accomplished by calculating the length of text being loaded into the compound instruction registers and adding it to the current value. The current value of the unload pointer is given by the signal IBULPTR.

In operation, as successive halfword portions of an instruction sequence are fed to the multiplexer/formatter 60, they are inspected and loaded into the compound instruction registers with two exceptions. When the multiplexer/formatter encounters either a BC or BCR instruction, it increments to the boundary of the next instruction, without validating the BC or BCR instruction for entry into the compound instruction registers. This is accomplished by a pair of decoders 64 and 65. The decoder 64 receives the op code of the instruction which is on the current left-hand boundary of the multiplexor/formatter, while the decoder 65 receives the op code of the instruction immediately following it. When either decoder detects either a BC or BCR instruction, it activates an output. The outputs are fed back to the multiplexer/formatter unit and prevent the loading into the compound instruction registers of the decoded branch instruction. All other branch instructions are loaded into the compound instruction registers. In this manner, the BC and BCR instructions are removed from the instruction pipeline, without introducing unused cycles. However, the presence of a BC or BCR instruction in the instruction stream is signified by the output of either of two latches 66 and 67. The latch 66 receives the output of the decoder 64, while the latch 67 receives the output of the decoder 65. The latches 66 and 67 are clocked by the pipeline clock and remain set for only one period of that signal. The same pipeline clock cycle enters instruction text into the compound instruction registers; therefore, the contents of the latches 66 and 67 correspond with the instruction decode (ID) stage of the pipeline.

Branch instructions which are entered into the compound instruction registers 20 and 21 are decoded at 70 and 72 during the instruction decode cycle. In the AGEN stage of the pipeline, there are provided four latches, 73, 74, 75, and 76 which respectively receive outputs from the latch 66, the decoder 70, the decoder 72, and the latch 67. Last, a pair of latches 79 and 80 are provided in the execution stage of the pipeline to receive the contents of the latches 74 and 75 in the address generation stage.

The latch sequence 66, 73 advances through the ID and AGEN stages of the pipeline a token indicating the presence of a BC or BCR instruction in the "left-hand" side of the pipeline, corresponding to that portion of the pipeline controlled through the CIRL 20. The token, termed a "BCL" token, is advanced through these two pipeline stages in synchronism with the operation of the pipeline. Similarly, the latches 67 and 76 advance a "BCR" token on the right-hand side of the pipeline for BC and BCR instructions which, but for being removed, would have been fed into the pipeline through the CIRR 21. Generally, BCR and BCL tokens are referred to as "BC" tokens; they signify decoding of BC or BCR instructions.

A token is advanced through the AGEN and EX stages of the pipeline by latches 74 and 79 for all branch instructions which are entered into the pipeline through the CIRL 20. Such tokens are called BRL tokens. Similarly, BRR tokens are carried through the AGEN and EX stages of the right-hand side of the pipeline for branch instructions entering the pipeline through the CIRR 21. Generally, BRR and BRL tokens are referred to as "BR" tokens; they signify decoding of branch instructions other than BC and BCR instructions.

The operations of the execution unit 34 and 36 are controlled conventionally by the pipeline to perform calculations and logical operations required by instructions in the pipeline. The results of instruction execution are fed to a condition code unit 83 which sets the condition code (CC) according to the outcome of instruction execution. A branch condition (BC) unit 85 provides branch condition signals in response to the outputs of the execution units 34 and 36.

Pipeline operations are synchronized with instruction issue by an AND gate 88. The gate 88 receives and END OP bit at the output of the MCS which is combined with the output of a pipeline condition sensor 87. The sensor 87 monitors the AGEN and EX stages of the execution pipeline for conditions requiring interruption of pipeline operations. For so long as no inhibiting conditions exist, the gate 88 activates a signal, NEXT, whenever the END OP bit of the currently accessed microinstruction is set, indicating the end of the microinstruction sequence for the current contents of the CIR's. When NEXT is activated, the multiplexer formatter is enabled to enter the next instruction or instruction pair into the compound instruction registers and the decoders 64, 65, 70, and 72 are enabled.

BRANCH CONDITION PROCESSING

In this description, branch condition processing consists of detecting a branch instruction in the current instruction stream, predicting whether or not the branch is taken, prefetching the instruction text for a branch which is predicted as being taken, performing the branch test inherent in the branch instruction, and issuing a corrected instruction "refetch", if necessary.

The first step is done by searching all instruction text before it is loaded into the first stage of the execution pipeline. This detection is done at the input to the IB 52 for the first five half words of a prefetched or refetched quadword, and the output of the IB 52 for all other instruction texts. As each branch instruction is detected, its text and location in the instruction sequence are provided to the branch processing unit 15. Based on the decoding of the branch instruction, the branch processing unit predicts whether or not the branch will be taken and initiates the necessary fetch or prefetch according to the prediction. The branch instruction location information is used to generate the address of the branch instruction in the cache. The branch target address (BTA) is generated. Next, the branch instruction text, its address, and a prefetch (PF) indicator are entered into a branch queue, which is operated as a FIFO queue. The PF indicator is conditioned to indicate whether or not a prefetch at the branch target address was made. In this regard, the PF indicator is a token which represents whether the branch was predicted as taken (PF=1) or not (PF=0). If taken, of course, a prefetch has occurred; if not, sequential fetching has continued.

Branch instructions are dequeued from the BQ in response to BC and BR tokens in the execution pipeline. Up to two instructions can be dequeued simultaneously. Dequeued instructions are tested in a branch test unit which utilizes the CC and branch conditions generated in response to execution unit operation to determine whether a branch is to be taken or not. The outcome is compared with the PF indicators of the dequeued instructions to determine whether a refetch must be made or not. If a refetch is required, the correct refetch address is generated and made available to the cache 12. It is asserted that the execution pipeline is constructed to be cleared in the event of a refetch; this is well within the ambit of the prior art.

The branch processing unit includes a decode and boundary detection unit 92 which receives instruction text and instruction location information either from the align unit 50 or the IB 52 of the instruction fetch and issue unit 14. The source is selected through a multiplexer (MUX) 90 in response to a sequential (S) or prefetch (PF) signal. The PF signal is active when a prefetch is being conducted, in which case the contents of the IB 52 will be overwritten with the prefetched instructions. This results in the provision of five halfwords of instruction text and 0 associated C-bits from the alignment unit 50, following which the PF signal will deactivate and the S signal will select from the IB 52 the five halfwords currently being selected by the align unit 55 for multiplexing and formatting into the compound instruction registers. The output of the alignment unit 50 is searched during a prefetch cycle since cache interface text will be provided beginning on an instruction boundary. This is a requirement for any detection, as instruction boundaries must be known in order to perform instruction decodes. During sequential fetching, the instruction text is obtained from the IB 52 where branch instructions may be detected in a manner similar to that employed by the align unit 55. When a branch instruction is detected, it is gated into a branch instruction register (BIR) 98 by a control signal (BR DEC). In searching for branch instructions, the decode/boundary detection circuitry 92 inspects every instruction which is streamed into the instruction processing unit. Recall that each instruction contains an indication of its own length. For each instruction that it inspects, the decode/boundary detection unit 92 generates an update amount corresponding to the length of the next instruction to be analyzed. This amount is registered at 93. Detection of a branch instruction by the unit 92 is indicated by a signal (BR DEC) which gates the instruction into the branch instruction register 98. The address of the branch instruction in the register 98 is provided by a branch instruction address generation (BIAG) unit 99 which is updated continuously from the last prefetch or refetch address by the stream of update amounts registered at 93.

A prediction decode circuit 96 responds to the decoding of a branch instruction by issuing a signal (PREDICT) which is conditioned to indicate the predicted outcome of the branch instruction as taken, in which case a branch target address (BTA) must be provided for prefetching, or not taken, in which case the next sequential address must be provided. The PREDICT signal is fed to an address prediction circuit 94 which generates the predicted address. The predicted address is fed through a multiplexer (MUX) 95 to an instruction fetch address register 97 which is available to the cache management mechanism for instruction fetching. Whether the branch outcome is predicted as taken or not taken, the address prediction circuit 94 also generates the branch target address (BTA) which is available, together with the branch instruction address (BIA) and PF token when the branch instruction text is available from the BIR 98.

Branch instructions which have been identified in the instruction stream and decoded by the branch processing unit 15 are queued in a FIFO branch queue (BQ) 102. Each time a branch instruction is registered at 98, the instruction text, together with the BTA BIA and PF token is entered into the branch queue 102.

Branch queue entries are dequeued in response to the BC and BR signals propagated in the execution pipeline. As FIG. 4 illustrates, the BQ 102 has two outputs 102a and 102b which permit up to two branch instructions to be dequeued concurrently.

The dequeued instructions are fed to a branch test unit 103 which receives the CC and branch condition signals from the execution units. The branch test unit uses these conditions to determine the proper outcome for a dequeued instruction, compares the determined outcome with the predicted outcome, and (if necessary) generates a REFETCH signal indicating that the branch outcome was incorrectly predicted.

If the REFETCH signal is active during any pipeline clock period, the branch queue 102 will provide branch instruction address and branch target address information stored with the incorrectly-predicted branch instruction to a refetch address circuit 105. The refetch address circuit 105 uses the address information stored with incorrectly predicted branch instructions to generate correct instruction fetch addresses. When the REFETCH signal is active, the multiplexer 95 selects the output of the refetch address unit 105, resulting in registration of the corrected address in the instruction fetch address register 97.

An instruction fetch sequencer 106 in the branch processing unit receives the outputs of the load and unload pointers 53 and 57 in the instruction issue unit, the PREDICT signal from the prediction decode unit 96, and the REFETCH signal from the branch test unit. The sequencer 106 responds to the condition of the PREDICT signal to set either the FETCH or PREFETCH signals. The FETCH signal, of course, indicates to the instruction fetch and issue unit that a sequential fetch is progress, resulting in sequential incrementation of all pointers and aligners in the unit. If the PREFETCH signal is active, pointers and aligners in the instruction fetch and issue unit are initiated to the prefetch address available in the instruction fetch address 20 register 97. Whenever the REFETCH signal is active, indicating an incorrect prediction of a branch instruction, the sequencer 106 produces a signal (INVALID) not shown in FIG. 4 invalidating the current content of registers, aligners, and pointers in the instruction fetch and issue unit and the contents of the instruction pipeline.

During sequential fetching, the sequencer 106 will maintain the FETCH signal active for so long as the IB 52 has room to accept instruction text. However, if the load pointer 53 advances to a value equal to the value in the unload pointer 57, the IB 52 is considered full and the FETCH signal is deactivated.

An OR circuit 107 funnels the REFETCH, FETCH, and PREFETCH signals to the cache as a cache fetch (CFETCH) signal. When the CFETCH signal is activated, the contents of the instruction fetch address register 97 are validated and the cache management initiates a fetch from the cache at the address in register 97.

BRANCH PROCESSING UNIT FIRST EMBODIMENT

Figure 5:
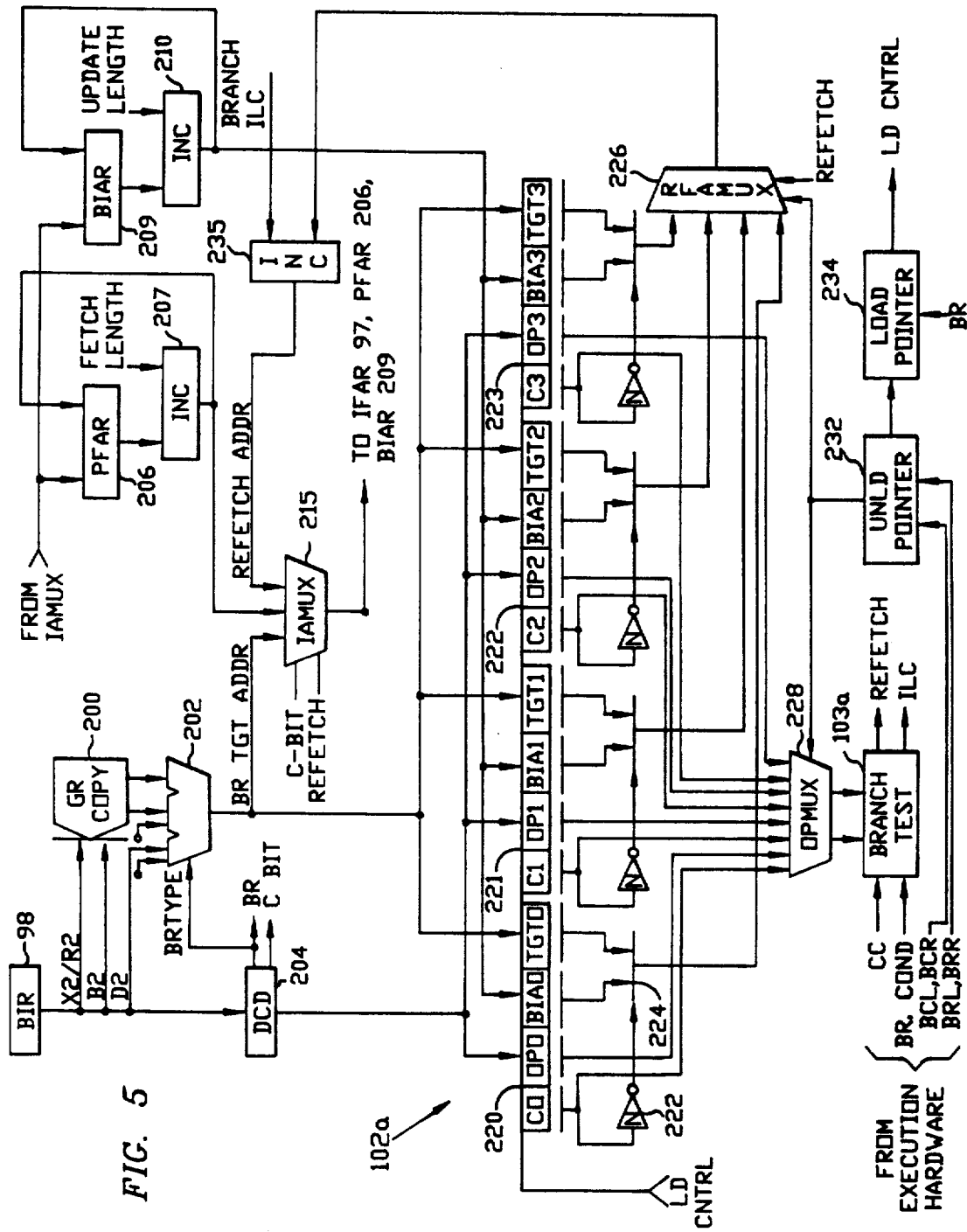
FIG. 5 is a more detailed block diagram of a first embodiment of a branch processing unit.

FIG. 5 illustrates a first embodiment of the branch processing unit 15 in which branch prediction is by way of C-bits which are generated by the compounding preprocessor 10 (FIG. 1). In this embodiment, branch instructions, together with at least their controlling C-bits, are stored in the branch instruction register 98. The branch target address is unconditionally generated, and the C-bits for the decoded branch instructions are used to determine whether the branch target address will be sent to the cache. If a branch is predicted to be taken, the branch target address is sent to the cache and a prefetch is begun. The prefetched instruction text is divided on instruction boundaries as described above and placed in the instruction buffer following the branch instruction just decoded. The address of the instruction sequentially following the branch instruction is saved in the BQ in case the branch was wrongly predicted.

If the branch is predicted not to be taken, then the branch target address is unconditionally generated, but is only saved in the BQ. The branch processing unit sends the address of the instruction text following the last valid instruction text in the IB to initiate a sequential fetch in case a location becomes available in the IB on the next cycle. In other words, the branch processing unit attempts to fill the instruction buffer with sequential instructions whenever it fails to encounter a predicted taken branch. In this manner, the branch processing unit 15 creates a single instruction stream to be processed by the execution unit and by itself, based on a predicted branch path.

In understanding this embodiment and the following embodiment, it is asserted that the instruction buffer 52 is loaded and unloaded under the control of pointers. Thus, while it may contain more than one branch instruction at one time, it is unloaded serially so that only a single instruction is presented at any time to the BIR 98 and branch processing unit for processing and enqueueing. Thus, in FIG. 5, the branch instruction currently residing in the BIR 98 is fed to a decoder 204 which inspects the OP code of the instruction to determine its format. For example, if the instruction is an RR type, it contains two register designations for operands, one of which is the branch target address. On the other hand, if the register is a RX type, it contains an address given by D(XB). The decoded instruction type controls a 3-to-1 adder 202 which receives inputs from a copy 200 of the GPR which is addressed by the register fields of the instruction. If the instruction is an RR type, one operand output from the GPR copy 200 is added to an implied zero; if the instructions is an RX type, the GPR copy operands denoted in the X and B fields of the instruction are added to the displacement in the D field of the instruction. The adder 20 is similarly controlled by the output of the decoder 204 to correctly add the relevant fields of an RS type instruction to produce the branch target address.

The branch processing unit also includes a prefetch address register (PFAR) 206 and a branch instruction address register (BIAR) 209. When an instruction sequence is initially loaded into the instruction fetch and issue unit, or when a prefetch or refetch operation is undertaken, the contents of the PFAR 206 and BIAR 209 are initialized to the address of the fetched instruction. Thereafter, every time a quadword is sequentially fetched, the contents of the PFAR 206 are updated at 207 by the length, in half words, of the fetch. Thus, the PFAR always points to the beginning address of the quadword currently being fetched from the cache. The BIAR 209 is updated at 210 by the contents of the register UPD 93, which is the length between branch instructions. Therefore, the BIAR 209 always points to the address of the currently-unloaded branch instruction.

The branch queue is indicated by 102a in the first embodiment. In FIG. 5, the branch queue 102a consists of four registers 220-223 which are loaded and unloaded under control of load and unload pointers 234 and 232, respectively. Each time a branch instruction is decoded at 204, its OP code is placed in the OP field of the register indicated by the load control (LD CNTRL) signal output by the load pointer 234. While the OP code of a branch instruction is being loaded into the indicated register of the branch queue 102a, its instruction address and its branch target address are loaded, respectively, into the fields BIA and TGT of the register. The BIA field value is obtained from the output of the incrementer 210, while the TGT field value is obtained from the output of the adder 202. Also loaded with the OP code of the currently-unloaded branch instruction is the C-bit used to predict the branch outcome. Following loading of the register, the load pointer is incremented to the next register.

Refer now to the branch queue register 220 which shows the four fields C, OP, BIA, and TGT for, respectively, the predictive C-bit, the OP code, the instruction address, and the branch target address of a queued branch instruction. The output of the C and OP fields of the register are fed to a multiplexer (OPMUX) 228, as are the corresponding fields of the other queue registers 221, 222, and 223. In addition, the contents of the C field are inverted at 222, the inverted signal being used to operate a two-to-one multiplexer 224. Assuming that the C-bit is set to predict a taken branch, and reset to predict a branch not taken, inversion of the value will cause the multiplexer 224 to select the address for the non-predicted outcome. This outcome is available through a refetch multiplexer (RFAMUX) 226. Each of the remaining registers 221, 222, and 223 is similarly coupled to the RFAMUX 226 to provide the non-predicted sequence of the branch instruction in the respective register.

When a BCL or BCR token arrives at the AGEN stage of the execution pipeline, the related branch token is available from the latch 73 or 76, respectively. Similarly, the BRL and BRR tokens are available at the execution stage of the pipeline from the latches 79 and 80, respectively. The BCL, BCR, BRL and BRR tokens are used to increment the unload pointer 232. The unload pointer 232 sets the OPMUX 228 and RFAMUX 226 to select either the next one or next two of the branch queue registers for provision to the branch test circuit 103a.

The branch test circuit 103a conducts a branch test indicated by the OP code of a branch instruction dequeued from 102a. The test consists of performing the architected branch test and comparing the outcome with the predicted outcome indicated by the setting of the C-bit for the branch instruction. If the actual outcome agrees with the predicted outcome, the entry is removed from the branch queue 102a and the instruction is completed. If the prediction does not match the actual branch decision, the branch test unit 103a activates the REFETCH signal. When the REFETCH signal is set, the selected instruction address in the currently-unloaded branch queue register is provided through RFAMUX 226. This is termed the REFETCH address. If the REFETCH address is a sequential address, the BIA field 20 value of the register indicated by the unload pointer 232 will be output by the RFAMUX 226. In this case, the branch instruction length code (ILC) in the branch OP code is provided, together with the BIA to the incrementer 235, which adds the two values, thereby providing as the REFETCH address the address of the instruction following the tested branch instruction in the instruction stream. Activation of the REFETCH signal sets the instruction address multiplexer (IAMUX) 215 to select the output of the incrementer 235, providing this value to the instruction fetch register (reference numeral 97 in FIG. 4) as well as to the PFAR 206 and BIAR 209. Otherwise, if the branch target address is selected, the branch ILC value is set to zero and the incrementer 235 merely passes on the branch target address as the REFETCH address. When the REFETCH signal is inactive, IAMUX 215 is conditioned by the C-bit for the branch instruction in BIR 98 being decoded. If the branch is predicted not taken, the contents of the PFAR 206, incremented by the length of the previous fetch are provided to the IFAR 97, the PFAR 206, and the BIAR 209. Otherwise, the output of the adder 202 is selected by the IAMUX 215.

It should be noted that activation of the REFETCH signal indicates misprediction of a branch outcome. Therefore, this signal can be used to condition the cached version of the C-bit for the mispredicted branch instruction. The instruction's address is available in the BIA field of the currently-unloaded branch queue register.

The branch test conducted by the branch test unit 103a for BC and BCR instructions merely consists of testing the condition code (CC) against the mask field in the instruction. Thus, the OP field of the branch queue registers must be wide enough to store both the OP code and mask field for these instructions. Further, no execution cycle is required for these instructions, and they appear to execute in zero time, at least as seen by the execution pipeline. All other branch instructions require an execution cycle to modify a GPR value. The EX instruction reads a general purpose register and modifies the fetched instruction text, conceptually requiring an execution cycle. The branch processing unit 15 performs the branch test for this instruction (which is decoded as a BR instruction generating a BRL or BRR token) following the execution cycle for that instruction and from that point on, operates as described above for BC and BCR instructions. Preferably, the BC and BCR instructions are not compounded with other instructions because they require no execution cycle, and would prevent compounding which would otherwise be possible. As explained above, the instruction fetch and issue unit decodes these instructions, but skips over them as they are encountered in IB, and loads the next non-BC/BCR instruction. Other branch instructions may be compounded (subject to certain constraints), and also enter the execution pipeline. Thus, it is possible for the branch unit to be required to do two branch tests in a single cycle.

Consider the case where a BCT instruction follows an AR instruction, and is compounded with it. Assume that a BC instruction follows the BCT instruction and tests the condition code resulting from execution of the AR instruction. In this case, the AR instruction would be detected at the output of the CIRL 20 when the BCT instruction is in the CIRR 21. When entry into these registers is made, the BC would be detected and decoded at 64 and latched at 66 in the period of the pipeline clock following latching of the AR and BCT at 20 and 21, respectively. When the BCT is latched at 21, it is detected at 70 and a BR token is entered into BRR 75. On the following cycle, the BC token is latched at 73, and the BRR token is latched at 80. Both tokens are, therefore, available concurrently in the pipeline for unloading the branch queue. This results in both branch tests being performed simultaneously, with the results being provided in the correct order. That is, if the BCT is wrongly predicted, the instruction stream is refetched using the correct entry for the BCT instruction in the branch queue. If the BCT prediction was correct, while the BC prediction was wrong, then the correct address derived from the BC entry in the branch queue would be used to refetch the instruction stream. If both branches are correctly predicted, both entries are effectively removed from the branch queue in the same cycle.

BRANCH PROCESSING UNIT SECOND EMBODIMENT

Refer now to FIGS. 6-9 for an understanding of the second embodiment of the branch processing unit 15. In the second embodiment, a branch target buffer (BTB) is used to record the history of branch outcome for branch instructions recently executed.

In FIG. 6 twelve branch instructions of the System/370 type are listed. The second embodiment of the branch processing unit processes the instructions listed in FIG. 6 by detecting the branch instruction in the BIR 98. Next, the branch direction is predicted, a branch target is prefetched (if predicted taken), and instruction text and related address and prediction information is entered into the branch queue. A branch instruction is held in the queue until a test of the branch prediction and target address (if predicted taken) can be performed in proper sequence. Corrective action is then taken if the branch direction or target address was mispredicted. These corrective actions include: invalidating the current contents of the instruction buffer, branch queue, and execution pipeline, fetching the true target instruction stream, and making or modifying a BTB entry if appropriate.

The current contents of BIR 98 are decoded by branch decode logic. In the decode logic, branch instructions are categorized according to FIG. 6. In FIG. 6, the branch instructions are divided into three categories, each with a different prediction method. Instructions from the first category cause no prefetch, but are entered into the branch queue and are unloaded at branch test time for consistency with the handling of other branch instructions. The instructions from the second category are known to be taken and will cause a prefetch to be issued to the cache. For these instructions, the branch target address may be generated in parallel with a BTB access. If a BTB entry is not found for this instruction, the branch target address is generated and will be used as the fetch address for the branch target prefetch. If a valid BTB entry is found for this branch instruction, it will be used instead. In either case, both BIAR 308 and PFAR 305 values will be set to the prefetch address to indicate the new instruction stream. Instructions from the third category are either unconditionally taken branches or conditionally taken branches. In either case, only a valid BTB entry will initiate a branch target prefetch from a storage location indicated in the BTB. If no valid BTB entry exists, no prefetch or target address generation occurs at this point. For instructions from all three categories, a branch queue entry is made following the branch decode.

Figure 7:
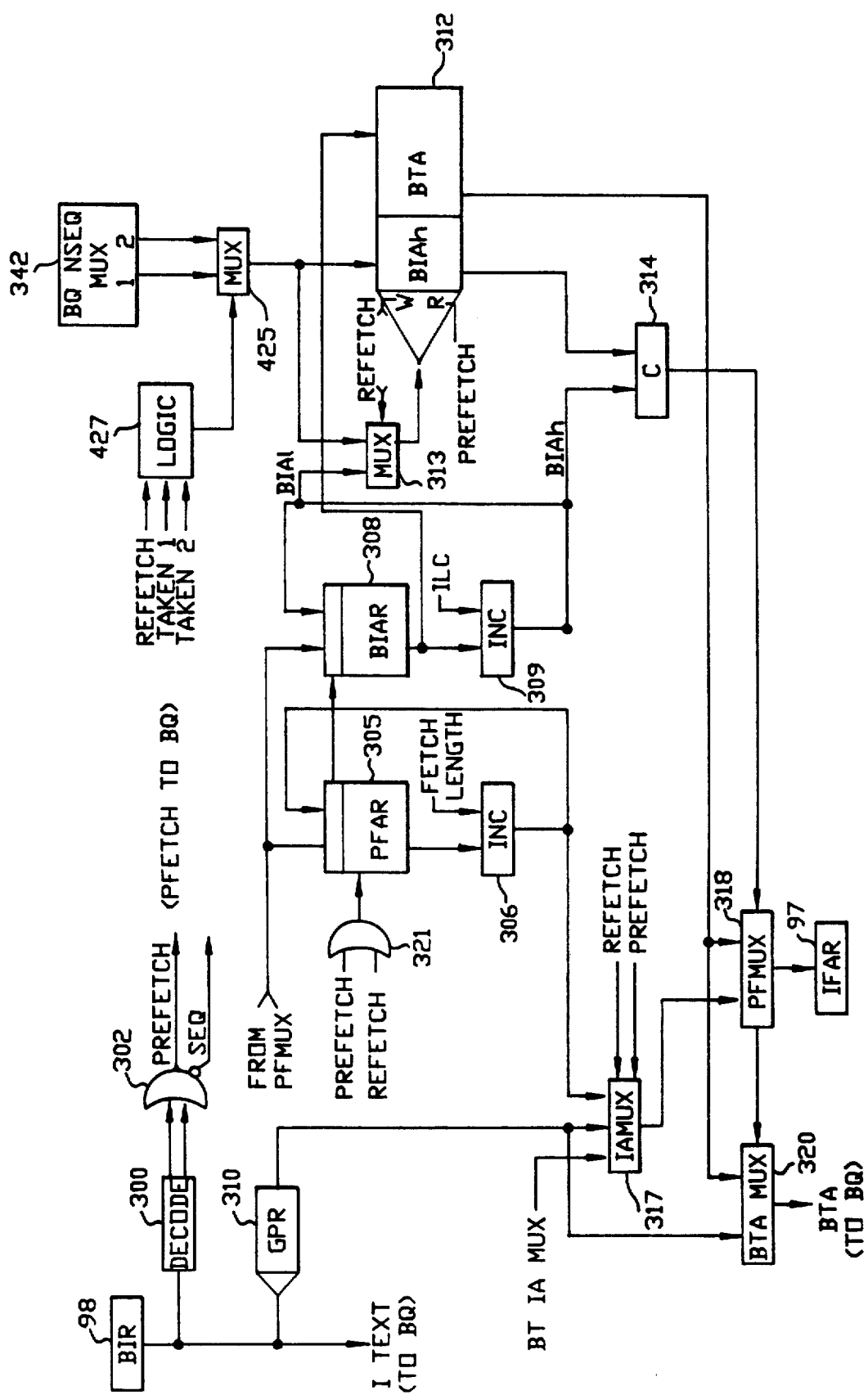
FIG. 7 shows in block diagram form the branch address mechanism of a second embodiment according to the invention.

FIG. 7 illustrates in block diagram form a prediction mechanism which operates in response to the branch decode operation just described. A branch instruction in the BIR 98 is decoded at 300 according to the conditions listed for the three categories in FIG. 6. If the branch instruction is in the second category, its prefetch address is generated and the decoder 300 produces a prefetch register (PFR) signal signifying the category. If the branch instruction is in the third category, the decoder 300 produces a prefetch branch target buffer (PFB) signal signifying the third category. Either of these signals requires a prefetch and the OR circuit 302 combines them and activates a PREFETCH signal if either is active.

The address prediction mechanism of FIG. 7 also includes prefetch address generation circuitry 305 and 306 which operates in the same manner as the PFAR circuitry of FIG. 5 to generate an address for the next quadword in sequence in the cache 12. A branch instruction address generator including elements 308 and 309 operates in the manner described for the BIAR circuitry of FIG. 5 to generate the address of the current branch instruction in the BIR 98. A copy of the general purpose registers (GPR) 310 is addressed by relevant fields of the branch instruction in the BIR 98. As those skilled in the art will realize, if the branch instruction is of the type which generates a branch target address by register reference, this address will be output by 310 during the decode operation.

A BTB 312 contains a plurality of entries at addressable locations. Each entry consists of the most significant portion of a branch instruction address (BIAh), a validity bit, and a branch target address (BTA). An entry is made into the BTB when a REFETCH is issued as the result of a failed branch test that causes a target instruction stream to be fetched. In general, the first time a taken branch is encountered it will not cause a target prefetch, as no entry will reside in the BTB. Instead, the branch test will detect the need for target fetch, will request the fetch, and make a BTB entry. In this way, the taken branch will cause the target prefetch to be sourced from the BTB the next time it is executed. Conversely, an entry in the BTB will be invalidated as the result of a failed branch test that causes the next sequential instruction to be fetched. This would occur when a BTB entry indicating the branch was taken was proven incorrect during testing of the branch instruction. Entries in the BTB 312 are addressed by the least significant bit portion of the branch address BIA1. Thus, assume that a branch instruction of category two or three is decoded at 300. In both cases, the output of the OR circuit 302 will activate PREFETCH, enabling the BTB 312 to be read. No refetch is underway so the multiplexer 313 is conditioned to select the current branch instruction address output by the incrementer 309. BIA1 is fed through the multiplexer 313 to the address port of the BTB 312, while BIAh is fed to a comparator 314. If an entry exists in the BTB 312 at the current address, the most significant BIA portion of the entry will be fed to the comparator 314. If the most significant portions are equal, the output of the comparator 314 will be activated, indicating that an entry in the BTB 312 exists for the decoded branch instruction, and implying that the BTA field of the entry may be used as the target address.

An IAMUX (instruction address multiplexer) 317 is controlled by the PREFETCH and REFETCH signals. If the REFETCH signal is inactive, the multiplexer 317 selects its input according to the state of the PREFETCH signal. If the PREFETCH signal is active, indicating that the decoder 300 has detected a branch instruction classed in one or two of the target prefetch categories, the output of the BD AGEN 310 is selected. If the PREFETCH signal is inactive, the implication is that the decoded branch signal is in the first prediction category; therefore, the output of the PFAR INC 306 circuit is selected.

The prefetch address for the next fetch is fed to the instruction fetch address register (IFAR) 97 from a prefetch multiplexer (PFMUX) 318. The PFMUX 318 selects the instruction fetch address from either the output of the IAMUX 317 or the BTA field of the currently-addressed BTB entry. The PFMUX 318 is controlled by the REFETCH signal and the output of the comparator 314. So long as the REFETCH signal is inactive, the output of the comparator 314 will select between the output of the IAMUX 317 and the BTA field of the currently-addressed BTB entry.

Under the condition that no refetch is occurring, the next fetch address to be entered into the IFAR 97 is selected through the IAMUX 317 and PFMUX 318. If the decoder 300 detects an instruction in the second or third category of FIG. 6, the PREFETCH signal is active, selecting the output of the GPR 310. If the decoded branch instruction is in the second category of FIG. 6 and no history of previous execution of this instruction has been entered into the BTB 312, the output of the comparator 314 will be inactive resulting in the entry of the GPR contents into the IFAR 97. If the PREFETCH is active, but a current BTB entry exists for the decoded branch instruction, the contents of the BTA field of the currently-addressed BTB entry will be entered into the IFAR 97. If the current branch instruction is a category one instruction and REFETCH is inactive, the PREFETCH signal will also be inactive, and no entry for the instruction will be found in the BTB. Therefore, the sequential address will be registered at 97 via 306, 317, 318.

The PFAR 305 and BIAR 308 are both initialized from the PFMUX 318 in response to the output of an OR circuit 321. The OR circuit 321 funnels the REFETCH and PREFETCH signals to the load control inputs of the PFAR and BIAR. If either of these signals is active, register contents are forced to the value output by the PFMUX.

Figure 8:
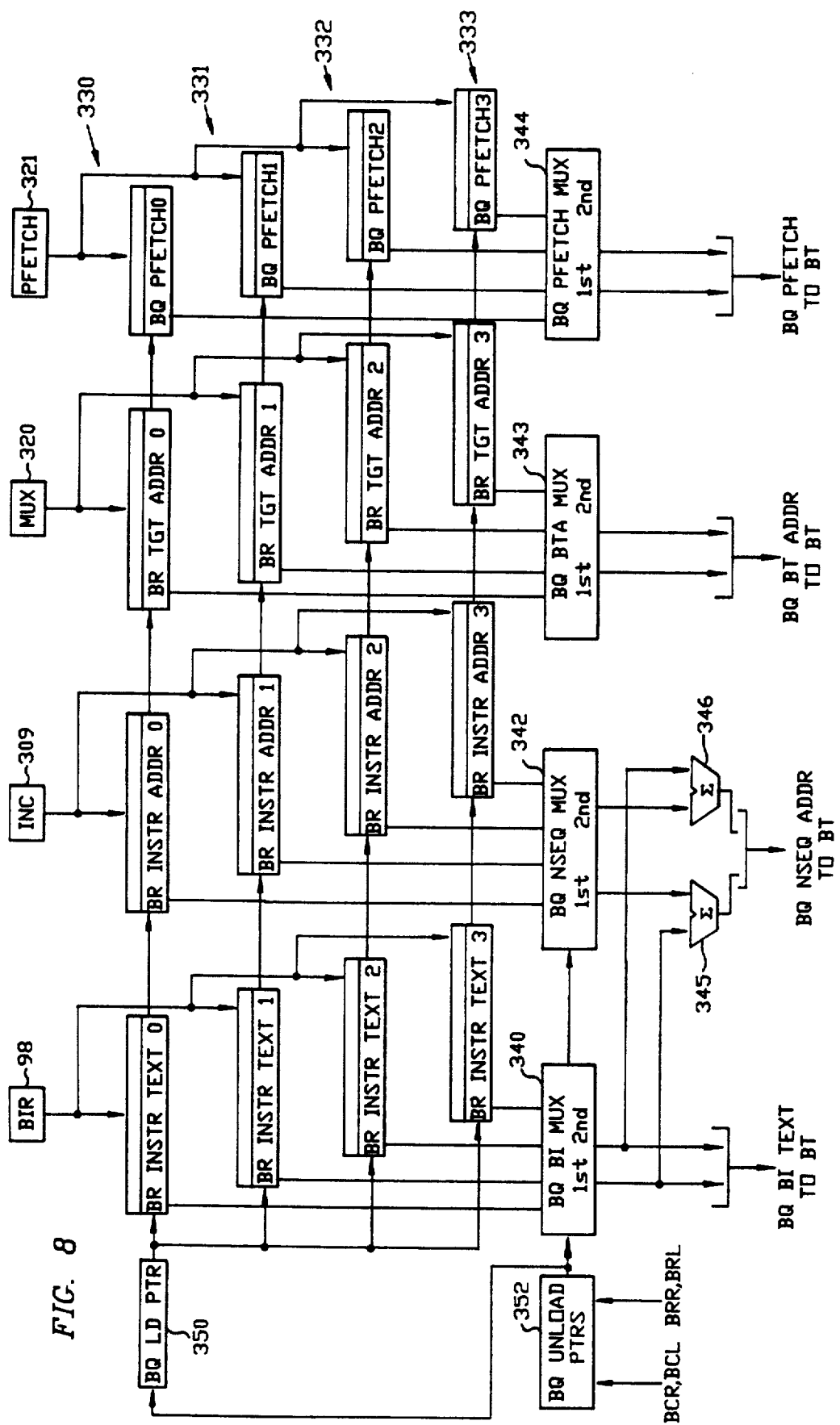
FIG. 8 illustrates a branch queue for a second embodiment.

Loading of the branch queue (BQ) can be understood with reference to FIGS. 7 and 8. Assume that a branch instruction has just been lodged in the BIR 98 and decoded at 300 and that a prefetch instruction address has been entered into the IFAR 97. At the same time that the IFAR 97 is loaded, the BQ receives the instruction text from the BIR 98, the branch instruction address from the output of the incrementer 309, the branch target address from the output of the multiplexer 320, and the PREFETCH signal from the OR gate 302. The multiplexer 320 receives inputs either from the currently-addressed GPR in 310 or the BTA field of the currently-addressed entry in the BTB 312. Assuming a BTB entry for the decoded instruction, the output of the comparator 314 is activated, causing the multiplexer 320 to select the BTA value. Assuming no entry exists, the output of BD AGEN 310 is provided through the multiplexer 320 to the BTA field BQ. The PFETCH signal which is equivalent to prefetch, is carried in the branch queue to record whether the branch was predicted as taken or not taken. If the branch instruction is decoded to an unconditional sequential fetch (category 1 of FIG. 6), the PREFETCH signal will be inactive.

In FIG. 8, the branch queue for the second embodiment is illustrated. The branch queue consists of register arrays 330, 331 332, and 333. Each register array includes a respective portion for branch instruction text, branch instruction address, branch target address, and the PFETCH prediction signal. Register arrays are loaded under control of the branch queue load pointer (BQ LD PTR). The load pointer is conventional, incrementing to point to the next register array after loading of the current one and pausing when the next available register array is pointed to by the branch queue unload pointer. The contents of the branch queue array are received from the prediction circuitry of FIG. 7. Branch instruction text is received from the BIR 98, the branch instruction address from the incrementer 309, the branch target address from the multiplexer 320, and the PREFETCH bit from the OR gate 302.

The branch queue is unloaded through four multiplexers; each is a four-to-two multiplexer which can provide one or two outputs from four possible inputs. The first multiplexer (BQ BI MUX) 340 selects branch instruction text to forward for branch testing; the multiplexer 342 (BQ NSEQMUX) selects branch instruction address information to forward for branch testing; the multiplexer 343 (BQ BTA MUX) selects branch target address information for branch testing; and the multiplexer 344 BQ PFETCH MUX selects PREFETCH bits for branch testing. The multiplexers 340, 342, 343, and 344 are operated in lock step so that each provides the same input-to-output configuration as the others. In this manner, either the contents of one register array are provided for branch testing, or the contents of two adjacent register arrays are provided.

Loading and unloading of the four branch queue register arrays is under the control of five pointers. The loading pointer is BQ_LD_PTR. Two unload pointers are provided for address generation unloading (BQ_AG_ULPTR1&2) and two unload pointers are provided for branch test unloading (BQ_BT_ULPTR1&2). Address generation and branch test activity require two pointers each because there may be two branch instructions being processed in any given cycle. The load pointer is incremented as branch queue entries are enqueued. The unload pointers are incremented as branch queue entries are dequeued.

The branch queue load pointer, reference numeral 350 in FIG. 8, indicates the next branch entry to load. The load pointer is conventional in all respects and can be implemented according the the needs of a particular application. Generally, the pointer will be initialized to zero with a refetch or prefetch and will increment with the loading of each branch queue entry.

As each branch decode operation commences, it will only be allowed to end if a branch queue entry is available to be enqueued; otherwise, the operation will suspend until the queue space becomes available.

In parallel with the loading activity, the branch queue is also being unloaded for branch testing, resulting in the dequeueing of entries.

Branch queue unload pointers are generated at 352 in FIG. 8. The unload pointers are incremented in response to the BCR, BCL, BRR, and BRL tokens which advance in the execution pipeline. In both the first and second embodiments, the compounding rules prevent the parallel execution of two BR type instructions, permit parallel execution of BR with BC instructions, and BC/BC parallel execution. Thus, at any period of the pipeline clock, a single BR token may be active, a single BC token may be active, a BR and a BC token may be active, and two BC tokens may be active. The unload pointers are advanced as follows. If one token —BCR, BCL, BRR, or BRL —is active, the unload pointers are advanced by one count and the oldest entry in the branch queue is unloaded through the first port of each of the multiplexers 340, 342, 343, and 344. If two branch tokens are active in the same pipeline clock period, the branch unload pointers are advanced by two counts, the oldest branch queue entry is unloaded through the first ports of the multiplexers and the next oldest branch queue entry through the second ports of the multiplexers.

Figure 9:
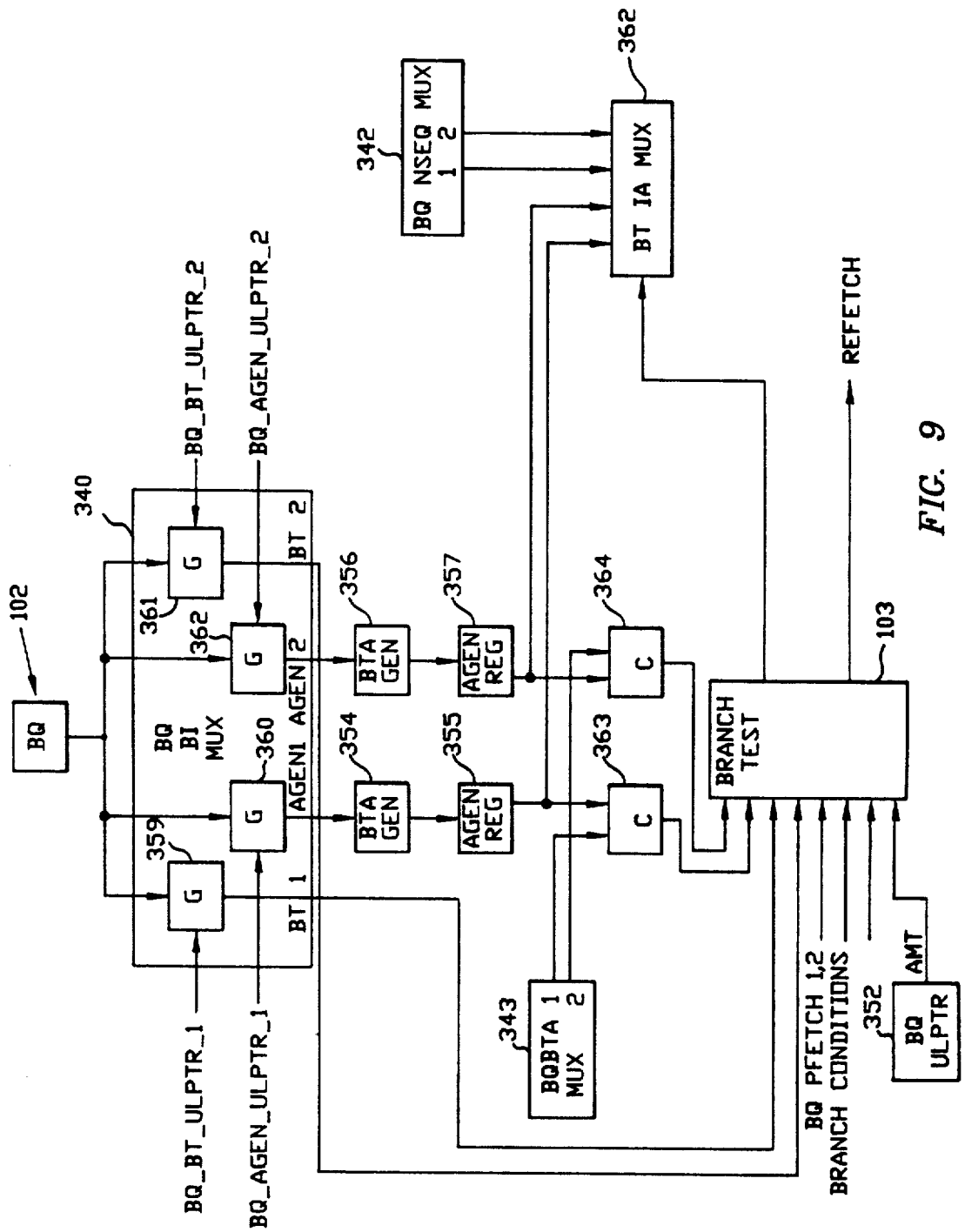
FIG. 9 illustrates a two-phase unload pointer for the second embodiment.

The pointer pairs are offset by one period of the pipeline clock as suggested by the unload pointer representation 352 in FIG. 9. In this regard, when one token is active during the current pipeline clock period, BQ_AGN_ULPTR1 is advanced to point to the next branch queue register array; in the immediately following pipeline clock period, BQ_BT_ULPTR1 is advanced to point to the same BQ register array.

Relatedly, when it is stated that a BQ unload pointer "points", the meaning is that it configures a multiplexer to connect the "pointed to" register portion to the multiplexer output controlled by the pointer.

Reference to FIG. 9 will provide an understanding of why a two-phase unload pointer is required in the second embodiment. In the second embodiment, the instruction text for the branch instruction next to be dequeued is gated by the respective BQ_AGN_ULPTR in order to permit calculation of the branch target address using the latest GPR copy. Thus, if the GPR contents have been updated since the last branch target address calculation for this instruction, the branch target address stored for this instruction in the BTB is invalid and a valid address can be provided with no further delay to the pipeline. Thus, in FIG. 9, branch target address generation circuit 354 includes a copy of the GPRs and a three-to-one adder for calculation of the branch target address according to well-known methods based upon System/370 branch instruction formats. The branch target instruction calculated at 354 is registered at 355. If two branch instructions are dequeued concurrently, a second branch target instruction calculation circuit 356 generates the branch target address for the second oldest branch queue occupant, with the generated address being registered at 357.

The structure of the multiplexer 340 and its control by the AGEN and BT unload pointers is illustrated in FIG. 9. The multiplexer 340 includes a first gate 359 controlled by the BQ_BT_ULPTR 1 and a second gate 360 associated with the gate 359 and controlled by the BQ_AGEN_ULPTR 1. Assume a single branch token is active during the current cycle of pipeline clock. That token causes the BQ_AGEN_ULPTR 1 to advance to a value unlocking the gate 360. This causes the instruction text to be gated from the BQ 102 through the AGEN1 port to the branch target address generation circuit 354. The address is calculated and registered at 355. Assume that the calculated branch target address is registered on the rising edge of the pipeline clock; the same edge will cause the BQ_BT_ULPTR 1 to increment to the same value as BQ_AGEN_ULTPR1, thereby activating the gate 359 and providing the instruction text for the oldest resident of the branch queue through the BTI port to the branch test circuit 103. If two branch tokens are active during the same cycle of the pipeline clock, the just-described two-step procedure is completed for the next-oldest resident of the branch queue through the AGEN2 and BT2 ports, via gates 361 and 362.

When the output of the address register 355 is first available, the BQ_BT_ULPTR 1 causes the multiplexers 340, 342, 343, and 344 to unload, respectively, the branch instruction text, the branch instruction address, the branch target address, and PFETCH bit of the branch queue register array which the pointer indicates. This results in the provision of the BTA stored in the branch queue to the comparator 363 which compares the value of the BTA in the branch queue with the value just calculated. The output of the comparator is activated if the values are unequal, indicating that the just-calculated BTA should be used if the branch is taken. The comparator 364 similarly compares the branch target address register at 357 with the branch target address of the next-oldest resident of the branch queue.

When the oldest branch instruction in the branch queue is dequeued, its address is fed through the multiplexer 342 to the adder 345. The adder 345 also receives the instruction length code from the instruction text of the oldest branch instruction and generates the next sequential address for use in the event that the branch is not taken. The adder 346 similarly calculates the next sequential address for the next oldest instruction in the branch queue if dequeued with the oldest resident.

BRANCH TEST

Figure 10:
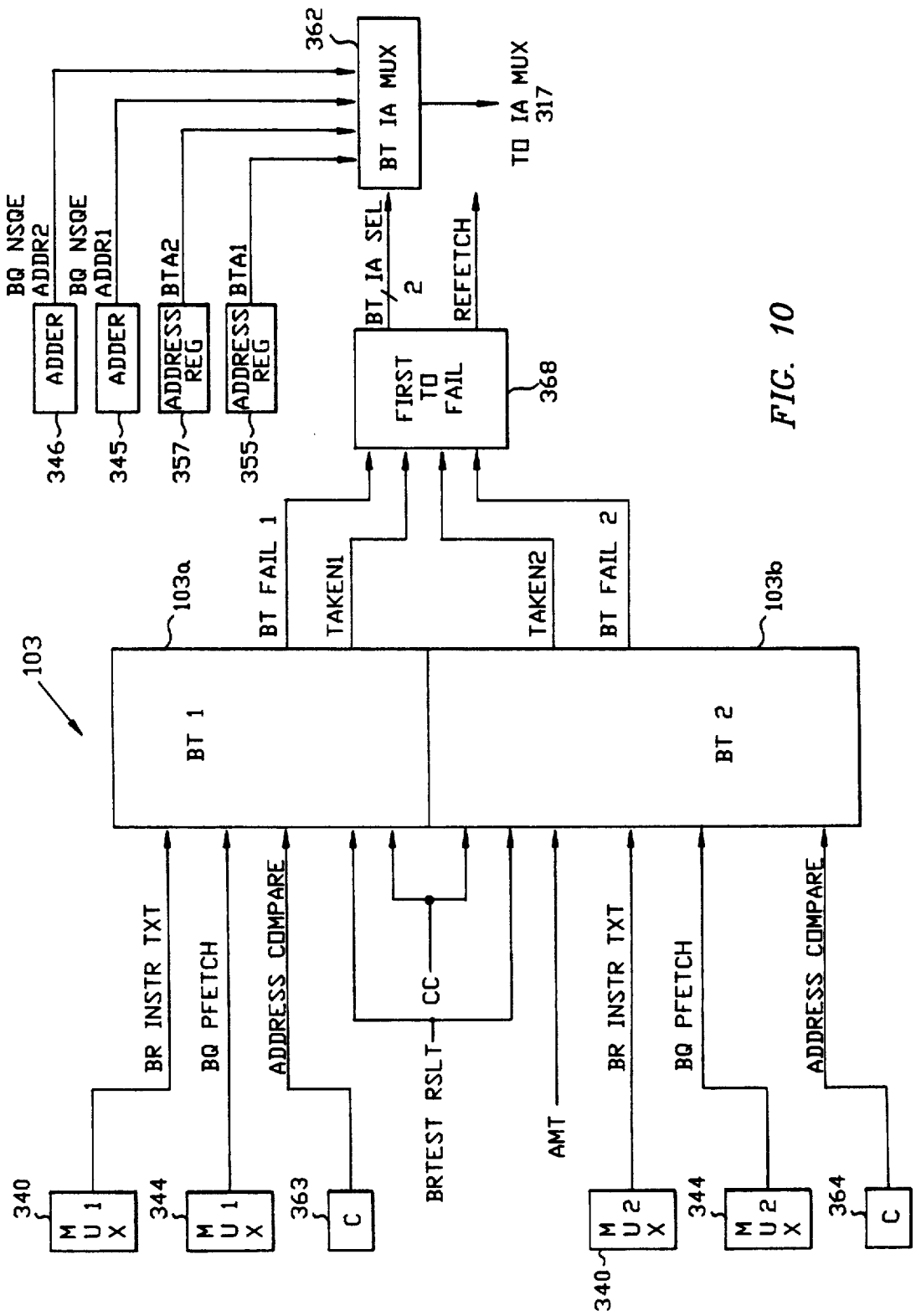
FIG. 10 illustrates a branch test unit.
Figure 11:
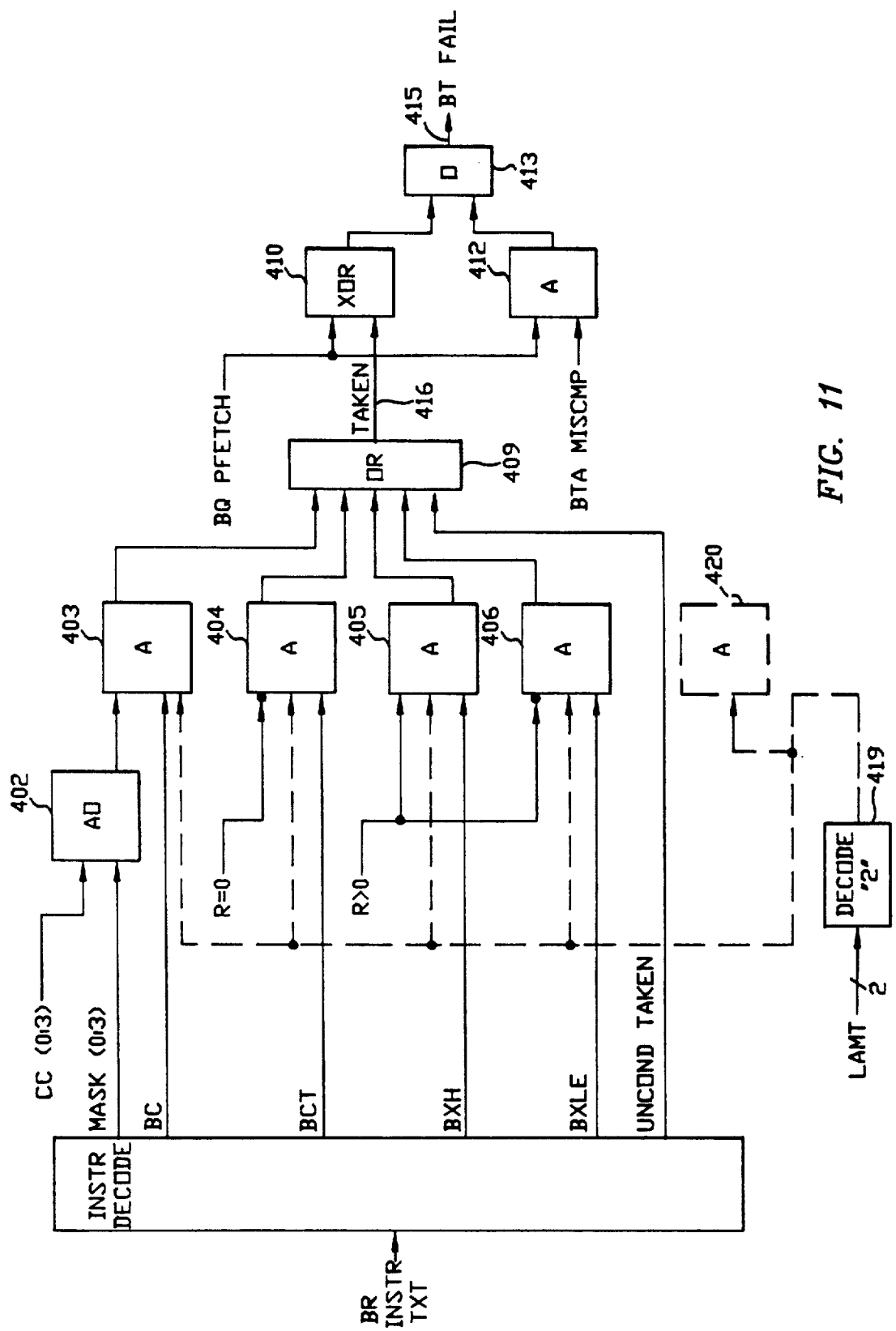
FIG. 11 is a digital logic schematic of the branch test unit.

FIGS. 10 and 11 and the following discussion concern the implementation of branch testing in the context of the second preferred embodiment. However, those skilled in the art will realize that the concepts can be applied equally to the first embodiment, with only minor adjustments.

In FIG. 10, the branch test unit 103 includes a first branch test mechanism (BT1) 103a for testing the branch conditions of the oldest resident of the branch. If two register arrays are unloaded from the branch simultaneously, a second branch test mechanism (BT2) 103b tests the branch conditions for the second-oldest of the dequeued instructions. In each case, branch testing requires provision of the condition code (CC) and branch test results from the execution unit, as well as branch instruction text, the PFETCH bit and the result of the branch target address comparison. Each of the branch test mechanisms provides two signals. The first signal (BT FAIL) indicates whether the predicted branch outcome matches the actual outcome, and the second (TAKEN) indicates whether, based upon execution unit condition, the branch is taken or not. Thus, for example, if the BT_FAIL_1 signal is active, the predicted outcome for the branch was incorrect and the signal TAKEN_1 indicates whether the actual outcome of the branch test is the branch that is taken or not taken. Preferably, if the branch is taken, the TAKEN signal is active, otherwise, if the branch is not taken, the signal is inactive. The branch test mechanism 103b for the next-oldest of two dequeued branch instructions provides signals BT_FAIL_2 and TAKEN_2 which are conditioned in the same manner as the signals output by the branch test mechanism 103a.

A "first-to-fail" circuit 368 receives the outputs of the branch test unit 103 and inspects the BT FAIL signals. If either signal is active, the circuit 368 activates the REFETCH signal. In addition, the circuit 368 decides which of two possible branch instructions was the first to be predicted incorrectly. In this regard, if only a single branch instruction is being dequeued and the circuit 368 detects a BT FAIL, that instruction is considered to be the "first to fail". If two branch instructions have been dequeued and BT_FAIL_1 is active, the oldest branch instruction of the dequeued pair is considered to have failed; otherwise, if BT_FAIL_1 is inactive but BT_FAIL_2 is active, the second instruction is considered the first to fail.

The first to fail circuit 368 conditions the BT_IA_SEL signal according to which currently-tested branch instruction has been deemed the first to fail. If BT_FAIL_1 is active, the BT_IA_SEL signal is conditioned to select the contents of the branch target address register 355, if TAKEN_1 is active, or the output of the adder 345, if TAKEN_1 is inactive. If two branch instructions are being tested and only BT_FAIL_2 is active, the BT_IA_SEL signal complex is conditioned to select the contents of register 357, if TAKEN_2 is active, or the output of the register 346, if TAKEN_2 is inactive. In this manner, the branch test instruction address multiplexer (BT_IA_MUX) 362 is conditioned by the BT_IA_SEL signal complex to select for the first branch instruction to fail either the branch target address if the branch was predicted not taken or the sequential address if the branch was predicted as taken.

Consider now the effect of activating the REFETCH signal on the prediction mechanism of FIG. 7. When the REFETCH signal is activated, the IAMUX 317 is conditioned to select the output of the multiplexer 362. The active REFETCH signal causes the PFMUX 318 to select the output of the IAMUX 317, resulting in entry of a refetch address selected by the BT IA multiplexer 362 as described above. This address is registered at 97. In addition, the OR gate 321 responds to the refetch activation by forcing the contents of the PFAR 305 and BIAR 308 to the refetch address value at the output of the PFMUX 318.

FIG. 11 is a digital logic schematic illustrating the structure of a branch test mechanism which generates the BT FAIL and taken signals required of the mechanisms indicated by reference numerals 103a and 103b in FIG. 10. The branch test mechanism includes an instruction decoder 400 which resolves the OP code of the branch instruction text into one of five classes of branch instructions. The operation of the decoder assumes that the branch instructions are drawn from the IBM System/370 instruction set. In this case, the BC, BCT, BXH, and BXLE outputs of the decoder are mnemonics for instructions in that set. The decoder assumes that all other branch instructions are unconditionally taken. If a BC instruction is decoded, the mask portion of the instruction text is provided to an AND-/OR (AO) circuit 402 which compares the mask with the condition code (CC). Assuming that the mask and condition code match, the output of the circuit 402 is activated and, if the instruction is BC, the output of the AND gate 403 is activated, indicating that the branch is to be taken. If the instruction is decoded as BCT, the inverse of the R=0 branch condition generated by the execution unit is enabled by the AND gate 404. The AND gate 405 enables BXH instruction to test the R>0 branch condition from the execution unit, while the AND gate 406 tests the BXLE instruction conditions against the inverse of the R>0 branch condition. All unconditionally taken branches result in activation of the UNCOND TAKEN signal by the decoder 400. If the output of any of the AND gates 403-406 is active, or if an unconditionally taken branch is detected, the output of the OR gate 409 activates. Activation of the output of this gate indicates that the indicated branch must be taken for the branch instruction being tested. This output is provided as the TAKEN signal of the branch test mechanism. The exclusive OR gate 410 compares the output of the OR gate with the PFETCH signal for the tested branch instruction. If the TAKEN and PFETCH signals are non-equivalent, the output of the XOR gate 410 activates indicating that the incorrect outcome was predicted for the branch and that a refetch is required. The AND gate 412 tests whether, in the event a branch target address was prefetched (indicated by activation of the PFETCH signal) a subsequent change in conditions since the prefetch has changed the branch target address. In this case, the output of the relevant comparator will indicate non-equivalence of the branch target addresses in the output of the AND gate 412 will be activated. The OR gate funnels the outputs of the exclusive OR and AND gates 410 and 412, producing a BT_FAIL signal if either is active. This output is provided on signal line 415 as the BT_FAIL for the mechanism, while the TAKEN signal on signal line 416 is provided as the TAKEN signal for the mechanism.

BTB UPDATING

If a refetch is required to obtain a branch target, an entry must be made to the BTB 312 for the branch instruction causing the refetch. In this regard, an entry for the instruction must be made including branch target address being fetched and the most significant portion of the branch instructions address. The entry must be stored at an address equivalent to the least significant portion of the branch instruction address. When a refetch is underway, the address of the branch instruction causing the operation is available through either the first or the second output of the multiplexer 342 in FIG. 8. The instruction text for the first-to-fail branch instruction is selected by a multiplexer 427 in FIG. 7, which is enabled by the refetch signal and which selects in response to a select signal output by a control circuit 427. The circuit 427 combines the BT_FAIL_1 & 2 and TAKEN 1&2 signals to select from the multiplexer 342 the branch instruction which is judged first to fail as described above. In this regard, if the BT_FAIL_1 and TAKEN_1 signals are concurrent, the oldest of the two dequeued branch instructions has caused the refetch and its address is selected from the first output of multiplexer 342. If BT_FAIL_1 is off, and if BT_FAIL_2 and TAKEN_2 are concurrent, the instruction address from the second output of multiplexer 342 is selected. The instruction address selected by the multiplexer 425 is provided to the BTB 312, with the most significant portion of the address being provided to the port for the BIAh value and the least significant portion being provided through the multiplexer 313 to the address port of the BTB 312. The multiplexer 313 will select this output for so long as the REFETCH signal is active. The BTA field of the addressed entry is provided from the contents of the BIAR and placed into the BTA field of the currently-addressed BT location during a branch target refetch. The BTB 312 is enabled to write by activation of the REFETCH signal for take branches.

POINTER OPERATION

FIG. 13 is a timing diagram illustrating, during 11 consecutive periods of the pipeline clock, how the invention tests branch conditions for one, or two, queued branch instructions. In preparation for explaining FIG. 13, reference is first given to FIGS. 11 and 12. FIG. 11 illustrates a branch test mechanism which can be used in both the first and second portions of the branch test unit. However, in order to operate the units correctly, indication must be provided as to the number of branch tests being conducted. Assuming that the explanation given hereinabove with reference to FIG. 11 fully lays out the common elements, reference is given to a decode circuit 419 in FIG. 11 which is present only in the second branch test mechanism. The input to the decode circuit 419 is a signal LAMT. This is a two-bit signal which is set either to a value '01' indicating that one branch instruction is being dequeued, or to '10', indicating that two branch instructions are being dequeued. If one branch instruction is being dequeued, operation of the second portion of the branch test unit is suppressed. On the other hand, if two branch instructions are dequeued, the second portion of the branch test unit must be enabled. The decode circuit 419 enables the second portion by activating its output when LAMT=10. This enables the gates 403-406. An additional AND gate 420 is provided in the second portion to gate the UNCOND TAKEN output of the instruction in response to the output of the decode unit 419.

Figure 12:
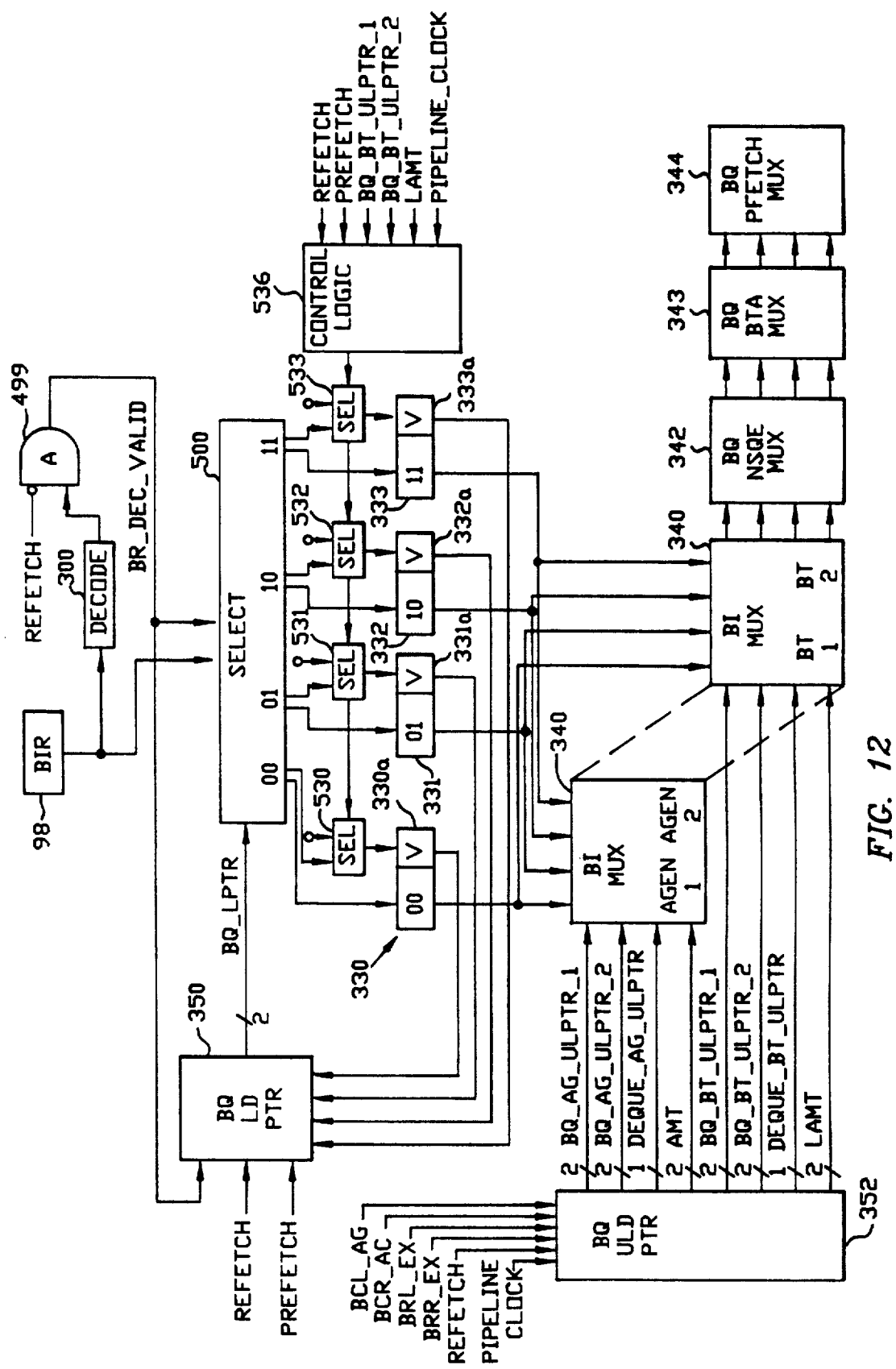
FIG. 12 illustrates how branch instructions are entered into extracted from a branch queue.

FIG. 12 is a block diagram illustrating in greater detail how branch instructions are entered into and extracted from the branch queue. The decoding of a branch instruction in BIR 98 is indicated by an output of the decoder 300. The AND gate 499 combines the decoder output with the inverse of the REFETCH signal. If no refetch procedure is underway and a branch instruction is detected in the BIR 98, the output of the AND gate activates a signal (BR_DEC_VALID) to indicate that the branch decode is valid. This signal is provided to the branch queue load pointer circuit 350. This signal is also provided, together with the instruction text in the BIR 98, to a select (SEL) circuit 500. The branch queue load pointer circuit 350 is configured as a two-bit register which holds a binary value (BQ_LPTR) indicating the next BQ entry to load. Initialized to zero, the value of this pointer will increment with the loading of each BQ entry. The pointer value will wrap through zero and will only be limited by the availability of a free BQ register array. The availability of a BQ register array is detected by the absence of a corresponding BQ validity bit. As FIG. 12 illustrates, each register array has, in addition to fields illustrated in FIG. 8, a validity bit field V. As each entry is enqueued, the bit in this field is set; as the entry is dequeued, this bit is reset. Thus, the branch queue load pointer circuit 350 must also receive the condition of the validity bit fields 330a, 331a, 332a, and 333a from the register arrays. When a branch instruction is decoded, the load pointer is incremented from the last-filled register array to the next. The register array which is to receive the contents of the BIR is indicated by the branch queue load pointer (BQ_LPTR), a two-bit signal encoded to indicate which of the register arrays is to receive the instruction text. This selection is done conventionally in the select circuit 500. The V field of the selected register array is conditioned by the output of the AND gate 499 via the select circuit 500. Thus, as instruction text is entered into the next branch queue register array, the validity bit is set.

The validity bit fields 330a, 331a, 332a, and 333a are controlled by respective select circuits 530, 531, 532, and 533. Each of these circuits is a two-to-one multiplexer whose state is conditioned by a control circuit 536. The default condition for each of these circuits is to the corresponding V-bit output from the SELECT circuit 500. However, if the REFETCH signal is activated, or if the contents of the register array are being unloaded for branch testing as indicated by one of the two branch queue unload pointers BQ_BT_ULPT_1 or 2, the selector input is connected to a hard wired "zero" for one cycle of the pipeline clock. This invalidates the branch queue entries whenever a refetch operation begins. This also synchronizes the dequeueing the branch queue entries for testing with the enqueueing of decoded branch instructions in the BIR 98.

The branch queue load pointer circuit 350 is initialized to zero whenever a refetch or prefetch operation occurs. The logic for incrementing the BQ_LPTR is given in Table I in conventional Boolean form. As an instruction is decoded from the BIR 98, an enqueueing is performed, making a complete entry as described above in the description of the branch queue. The branch queue load circuit 350 will load available BQ entries in sequence until the queue is full. It should be noted that in parallel with this activity, the queue is also being unloaded for branch testing, resulting in the dequeueing of entries. Thereby, positions in the queue are released (as indicated by the reset V-bits) to be loaded again. Four branch queue unload pointer signals are generated by the branch queue unload pointer 352. Each pointer is a two-bit signal whose setting "points" to a correspondingly-numbered branch queue register array. Two of the pointers, BQ_AG_ULPTR 1&2, are for unloading instruction text from the BQ through the AGEN 1 and AGEN 2 ports of the BI multiplexer 340 in FIG. 9. Two other unload pointers, BQ_BT_ULPTR 1&2 are for unloading instruction text through the BT1 and BT2 ports of the BI multiplexer 340. A signal output by the unload pointer 352, LAMT, indicate the number of branch queue entries being dequeued for address generation and branch testing, respectively. This signal is a two-bit value set to either '01' to indicate that one instruction is being dequeued or to '10' to indicate the dequeueing of two instructions. The signal LAMT represents the latching of a signal AMT generated internally in the unload pointer circuit 352.

That signal is latched to delay it by one period of the pipeline clock.

The unload pointer circuit 352 increments the unload pointer signals in response to the branch tokens in the execution pipeline. The BC tokens are provided for pointer incrementation from the address generation stage of the pipeline and are denoted as BCL_AG and BCR_AG. All other branch tokens are provided in the execution stage of the pipeline and are denoted as BRL_EX and BRR_EX. The unload pointer circuit 352 also receives the REFETCH signals and the PIPELINE_CLOCK signal.

The BQ_BT_ULPTR 1 pointers indicate the oldest resident of the branch queue; the BQ_BT_ULPTR 2 signals always indicate the next-oldest branch queue resident. Each BQ_AG_ULPTR is updated one pipeline clock period in advance L of the corresponding BQ_BT_ULPTR in order to access instruction text so that the most current branch target address can be calculated.

The BQ unload pointers BQ_AG_ULPTR 1 and BQ_BT_ULPTR_1 are configured as two-bit registers. The pointers BQ_AG_ULPTR_2 and BQ_B-T_ULPTR_2 are decoded from the corresponding register pointers. All pointers hold binary values indicating which branch queue entries are to be gated to the appropriate AGEN and BT outputs of the BI multiplexer 340. The AG unload pointers constantly provide branch instruction text to the branch target address generation functions. The results of the two branch target address calculations are latched into the corresponding AGEN AR registers 355 and 357 at the end of a pipeline clock. In the following pipeline clock period, the BQ_AG_ULPTR values are incremented by an amount equal to the number of branch instructions dequeued.

The two BT unload pointers are one entry behind the AG unload pointers. The BT pointers use the results generated by updating the AGEN pointers to perform branch direction testing. Like the AGEN pointers, the BT pointers are advanced with each completed branch test under control of the branch tokens.

Internal logic for a branch queue unload pointer finite state machine is given in Tables II and III in well-known Boolean form. The Boolean value AG_IN-CR_AMT (0:1), when latched by PIPELINE_ CLOCK becomes LAMT.

As FIG. 12 shows, the AGEN unload pointers and the AMT signal are fed to the BI multiplexer to control the AGEN outputs. Thus, during the current pipeline clock period, the register array pointed to by the AGEN unload pointer 1 is provided through the AGEN 1 output of the multiplexer 340. If AMT=10, instruction text in the register pointed to by the AGEN unload pointer 2 is fed through the AGEN 2 output of the multiplexer 340. The BT outputs of the multiplexer 340 are similarly controlled by the BT unload pointers 1 and 2 and the value of LAMT signal.

The control logic 536 responds to the updating of the BT unload pointers and to the LAMT signal by resetting the V bit and the register array pointed to by the BT unload pointer 1; if LAMT=10, the V bit in the register array pointed to by the BT unload pointer 2 is also reset.

OPERATION OF THE BRANCH PROCESSING UNIT

FIG. 13 is a timing diagram illustrating, for 11 consecutive periods of the pipeline clock, how the branch processing unit 14 operates. In clock period 1, assume a fetch occurs bringing three consecutive branch instructions to the instruction fetch and issue unit. The first branch instruction Br a is fed immediately to the branch processing unit and latched into the BIR 98. Simultaneously, the CIR multiplexer feeds the instruction to the CIRL 20. In the following period, cycle period 2, the branch instruction is decoded by the decoding circuit 70 in the execution pipeline and by the decoding circuit 300 in the branch processing unit. Branch decoding is indicated by "BD". Assuming that the branch instruction generates a single-cycle microinstruction sequence, the END_OP bit will be available at the output of the MCS during this cycle, resulting in the entry of a BRL token into the AGEN latch 74 in cycle period 3. (This is indicated by BR_AG.) Following the first branch instruction, the second branch instruction, Br b, is registered into the CIRL and BIR in cycle period 2, and is decoded at 70 and 300 in cycle period 3. In cycle period 3, the third branch instruction BC instr is registered at the CIRL 20 and BIR 98 and is decoded at 70 and 300 in cycle period 4.

In cycle period 4, the BRL token for the branch instruction Br a has advanced to the execution stage of the pipeline as indicated by a in the BR_EX line of FIG. 13. This activates the DEQUE_AG_ULPTR signal. In addition, the AG_INCR_AMT signal is set to '01' since there is only one BR token in the execution stage of the execution pipeline and there are no BC tokens in the address generation stage. In cycle period 5, the AGEN unload pointers are both incremented by one, while the DEQUE_BT_ULPT signal is activated. Since LAMT is set to '01', only the contents of the first branch queue register array are provided to the branch test circuit through BT1 of the multiplexer 340.

In period 5 of the pipeline clock, the BR token for branch instruction b has reached the execution stage of the execution pipeline while the BC token for the BC instruction has reached the address generation stage of the pipeline. At this point, the DEQUE_AG_ULPTR signal remains active, while the AG_INCR_AMT signal is set to '10'. This results in the dequeueing of branch instruction b and the BC instruction from branch queue through the AGEN 1 and AGEN 2 outputs of the BI multiplexer 340 during clock period 4. In clock period 5, the AGEN unload pointers both incremented by the digital value (10) while the DEQUE_BT_ULPTR signal remains set. As a result, the branch instruction information in queue positions '00' and '01' are dequeued for branch testing in cycle period 6. In cycle period 7, the BT unload pointers are each updated by the digital value '10'.

It should be noted that the END_OP activation in FIG. 13 determines the length in pipeline clock periods which a branch instruction stays in the queue. If a branch instruction is decoded with a two-microinstruction sequence, the END_OP bit will occur one period after the branch instruction is decoded; consequently, the token for the instruction will be delayed for one clock period, thereby stretching the time on the queue two clock periods.

It is observed that FIG. 13 further shows the fetching of two branch instructions, Br d and Br e, as a result of decoding the BC instruction. The fetch occurs in clock period 5, branch instruction d is decoded in clock period 6, waits on the queue during clock period 7, is dequeued for address generation in clock period 8, and dequeued for branch testing in clock period 9. Branch instruction e exhibits this sequence, delayed by one clock period from branch instruction d.

While we have described our inventions in their preferred embodiment and alternative embodiments, various modifications may be made, both now and in the future, as those skilled in the art will appreciate upon the understanding of our disclosed inventions. Such modifications and future improvements are to be understood to be intended to be within the scope of the appended claims which are to be construed to protect the rights of the inventors who first conceived of these inventions.

TABLE I

```
/*Detect current Branch Test*/
/*Latch up previous cycle agen*/
DEQUE_BT_ULPTR_L1 = DEQUE_AG_ULPTR;
/*data port of BT ULPTR register, master portion.*/
/*This is effectively equal to AG point from previous
cycle.*/
BQ_BT_ULPTR_O_L1(0:1) =   BQ_AG_ULPTR_O_L2(0:1);
/*BT ULPTR_1 always equals incremented BT_ULPTR_O.*/
BT_ULPTR _INC(0:1) =      '00' when (BQ_BT_ULPTR_L2(0:1) = '11') or
                          '01' when (BQ_BT_ULPTR_L2(0:1) = '00') or
                          '10' when (BQ_BT_ULPTR_L2(0:1) = '01') or
                          '11' when (BQ_BT_ULPTR_L2(0:1) = '10');
BQ_BT_ULPTR_1(0:1) =      BT_ULPTR_INC(0:1);
```

TABLE II

```
/*Detect current AGen
DEQUE_AG_ULPTR = BR_EX_L2(0) or BR_EX_L2(1) or BC_AG_L2(0)
    or BC_AG_L2(1);
/*new values for pointer.*/
AG_ULPTR_INC_1(0:1) =   '00' when   (BQ_AG_ULPTR_L2(0:1) = '11') or
                        '01' when   (BQ_AG_ULPTR_L2(0:1) = '00') or
                        '10' when   (BQ_AG_ULPTR_L2(0:1) = '01') or
                        '11' when   (BQ_AG_ULPTR_L2(0:1) = '10');
AG_ULPTR_INC_2(0:1) =   '00' when   (BQ_AG_ULPTR_L2(0:1) = '10') or
                        '01' when   (BQ_AG_ULPTR_L2(0:1) = '11') or
                        '10' when   (BQ_AG_ULPTR_L2(0:1) = '00') or
                        '11' when   (BQ_AG_ULPTR_L2(0:1) = '01');
```

TABLE II-continued

```
/*compute number of AGens currently being done.*/
/*This defines increment amount.*/
AG_AMT(0:3) = BR_EX_L2(0:1) || BC_AG_L2(0:1);
AG_INCR_AMT(0:1)=      '01' when ( (AG_AMT(0:3)='1000') or
                                    (AG_AMT(0:3)='0100') or
                                    (AG_AMT(0:3)='0010') or
                                    (AG_AMT(0:3)='0001'))
                       '10' when ( (AG_AMT(0:3)='0011') or
                                    (AG_AMT(0:3)='0101') or
                                    (AG_AMT(0:3)='0110') or
                                    (AG_AMT(0:3)='1001') or
                                    (AG_AMT(0:3)='1010') or
                                    (AG_AMT(0:3)='1100'));
AG_ULPTR_INC(0:1)=     (AG_ULPTR_INC_1(0:1) and
                           (AG_INCR_AMT(0:1)='01')) or
                       (AG_ULPTR_INC_2(0:1) and
                           (AG_INCR_AMT(0:1)='10'));
/*data port of AG ULPTR register, master portion.*/
BQ_AG_ULP-             (AG_ULPTR_INC(0:1) and
TR_O_L1(0:1)=
                           DEQUE_AG_ULPTR) or
                       (BQ_AG_ULPTR_O_L2(0:1) and not
                           (DEQUE_AG_ULPTR));
/*AG ULPTR_1 always equals incremented AG_ULPTR_O.*/
BQ_AG_ULPTR_1(0:1)=    AG_ULPTR_INC_1(0:1);
```

TABLE III

```
/*increment for new load pointer value.*/
LPTR_INC(0:1)=         '00' when (BQ_LD_PTR_L2(0:1)='11') or
                       '01' when (BQ_LD_PTR_L2(0:1)='00') or
                       '10' when (BQ_LD_PTR_L2(0:1)='01') or
                       '11' when (BQ_LD_PTR_L2(0:1)='10');
/*detection of valid selected entry.*/
SEL_BQ_VAL=            ((BQ_LD_PTR_L2(0:1)='00') and BQ_VAL_L2(0))
or
                       ((BQ_LD_PTR_L2(0:1)='01') and BQ_VAL_L2(1))
or
                       ((BQ_LD_PTR_L2(0:1)='10') and BQ_VAL_L2(2))
or
                       ((BQ_LD_PTR_L2(0:1)='11') and BQ_VAL_L2(3));
/*gating condition to allow advancement of pointer.*/
/*also controls latching of new data into corresponding BQ
register.*/
ENQUE_BQ=BR_DEC_VALID and not (SEL_BQ_VAL);
/*data input to master portion of load pointer register.*/
BQ_LD_PTR_L1(0:1)=     (LPTR_INC(0:1) and ENQUE_BQ) or
                       (BQ_LD_PTR_L2(0:1) and not ENQUE_BQ));
```

We claim:

1. In a digital computer which includes an instruction source for providing instructions to be executed, an execution pipeline for executing a stream of instructions, and a condition determination means connected to the execution pipeline for providing condition signals indicating results of executed instructions, a combination for branch instruction processing, the combination comprising:

instruction issue means coupled to the instruction source and to the execution pipeline for providing a stream of instructions to be executed; and branch instruction processing mean s for searching all instruction text of a current instruction sequence of said instruction stream to detect all branch instructions in said instruction sequence and determine the text and location of each of said detected branch instructions, for removing ones of said detected branch instructions not requiring execution in the execution pipeline from the instruction sequence before said instruction sequence is loaded into the execution pipeline, for decoding and predicting whether or not a branch will be taken by using the branch instruction location as an address for the branch in a branch history cache, for initiating a necessary fetch or prefetch according to said prediction, and for concurrently executing a plurality of said removed branch instructions substantially in parallel with other ones of said instructions of said instruction sequence executing in the execution pipeline.

2. The combination of claim 1, wherein the digital computer further includes compounding means for generating compounding information for each of said instructions, the compounding information indicating whether the instruction is to be executed in parallel with another one of said instructions, the compounding means conditioning the compounding information for each of said branch instructions to indicate a predicted instruction sequence resulting from execution of the branch instruction, the combination wherein prediction means in the branch instruction processing means and coupled to the instruction source for fetching to the instruction issue means a target sequence of instructions in responses to compounding information indicating whether execution of a branch instruction will result in the sequence of instructions branching to a target sequence before logically previous ones of said instructions are dispatched.

3. The combination of claim 2, further including:

test means in the branch instruction processing means for producing a refetch signal in response to condition signals indicating that the result predicted by the compounding information is incorrect; and refetching means in the branch instruction processing means and coupled to the test means for fetching to the instruction issue means a corrected sequence of instructions in response to the refetch signal.

4. The combination of claim 3, further including means responsive to the refetch signal for changing the compounding information to indicate another result.

5. The combination of claim 1, wherein the instruction source provides instructions in response to an instruction identification signal, the branch instruction processing means including:

means connected to the instruction issue means for generating a prediction signal for each said branch instruction in the stream of instructions, the prediction signal indicating a predicted outcome for execution of the branch instructions;

means connected to the prediction means and to the instruction issue means for enqueueing said branch instructions and prediction signals;

means responsive to the prediction signal and to the stream of instructions for generating an identification signal identifying instructions to be executed as a result of a predicted outcome; and test means connected to the enqueueing means and to the prediction means for executing one of said enqueued branch instructions and for changing the identification signal if results produced by executing the branch instruction indicate that the outcome indicated by the prediction signal enqueued with the branch instruction is incorrect.

6. The combination of claim 5, wherein the test means includes means for dequeueing concurrently more than one of said branch instructions and for changing the identification signal if a predicted outcome for at least one of said executed branch instructions is incorrect.

7. The combination of claim 6, further including synchronization means connected to the execution pipeline and to the enqueueing means for providing queued instructions to the test means in synchronization with execution of the stream of instructions.

8. The combination of claim 6, wherein the branch instruction processing means includes a branch target buffer.

9. A digital computer including an instruction source responsive to fetch address signals for providing instructions identified by the fetch address signals, an execution pipeline for executing a stream of instructions, a condition means connected to the execution pipeline for providing condition signals indicating instruction execution results, and instruction sequencing means connected to the instruction source and to the execution pipeline for providing a sequence of fetch address signals to the instruction source and for coupling to the execution pipeline a sequence of instructions of said instruction stream provided by the instruction source in response to the sequence of fetch address signals, a method for executing branch instruction in parallel with the execution of instruction by the execution pipeline, the method including the steps of:

(a) detecting all of said branch instructions in the sequence of instructions;

(b) removing ones of said detected branch instructions not requiring execution in the execution pipeline;

(c) generating a prediction signal indicating a predicted outcome for each of said removed branch instructions;

(d) in response to the prediction signal for one of said branch instructions, conditioning the fetch address signals to a predicted sequence corresponding to a predicted outcome indicated by the condition of the prediction signal;

(e) in synchronization with execution of other said instructions in the execution pipeline, concurrently executing two or more of said removed branch instructions in the instruction sequencing means to determine actual outcomes in response to condition signals;

(f) comparing the actual outcome for each of the two or more executed branch instructions with the predicted outcome indicated by the prediction signal for each of said branch instructions; and (g) if the predicted outcome for one of the two or more branch instructions is incorrect, conditioning the address signals to a refetch sequence corresponding to a correct outcome for the branch instruction; otherwise (h) continuing the sequence of fetch addresses and performing steps (a)–(g).

10. The method of claim 9, further including, after step (d), for each branch instruction;

(d1) generating an instruction address for the branch instruction;

(d2) generating a branch target address for the branch instruction; and (d3) enqueueing the branch instruction, the branch instruction address, the branch target address, and the prediction signal for the branch instruction; and, wherein step (d) includes, prior to executing, dequeueing the two or more branch instructions.

11. The method of claim 9 further including, before step (e) generating a token for each said branch instruction in the sequence of instructions and propagating the generated tokens in the execution pipeline; and wherein step (e) is executed in responses to the tokens propagating to a predetermined pipeline stage.

12. The method of claim 11, wherein first tokens are generated for the branch instructions which only test the condition signals and wherein step (e) is executed in response to the first tokens propagating to an address generation stage of the execution pipeline.

13. The method of claim 12 wherein second tokens are generated for the branch instructions which require pipelined execution to change the condition signals and wherein step (e) is executed in response to the second tokens propagating to an execution stage of the execution pipeline, the execution stage following the address generation stage.

14. The method of claim 12, further including, after generation of the first tokens, removing from the sequence of instructions the branch instructions which only test the condition signals.

15. In a digital computer including an instruction source responsive to fetch address signals for providing instruction identified by the fetch address signals, an execution pipeline for executing a stream of instructions, a condition means connected to the execution pipeline for providing condition signals indicating instruction execution results, an instruction sequencing means connected to the instruction source and to the execution pipeline for providing a sequence of fetch address signals to the instruction source and for coupling to the execution pipeline a sequence of instructions provided by the instruction source in response to the sequence of fetch address signals, a method for executing branch instructions in parallel with the execution of instructions by the execution pipeline, the method including the steps of:

(a) detecting all of said branch instructions in the instruction sequence by decoding each of said branch instructions and issuing a prediction signal for each of said decoded branch instructions to indicate a predicted outcome for the decoded branch instruction;

(b) removing from the instruction sequence ones of said detected branch instructions which only test conditions created by execution of previous ones of said instructions, thereby not requiring execution in the execution pipeline;

(c) in response to the prediction signal for each of said removed branch instructions, conditioning the fetch address signals to a predicted sequence corresponding to the predicted outcome indicated by the prediction signal;

(d) in synchronization with execution of other ones of said instructions of said instruction sequence in the execution pipeline, concurrently executing at least two of said removed branch instructions by testing condition signals according to the branch instruction to determine an actual outcome for the branch instruction;

(e) comparing the actual outcome for the branch instruction with the predicted outcome indicated by the prediction signal for the branch instruction; and (f) if the predicted outcome is incorrect, conditioning the address signal to a refetch sequence corresponding to a correct outcome for the branch instruction; otherwise, (g) continuing the sequence of fetch addresses and performing steps (a)-(f).

16. The method of claim 15, further including, after step (c):

(c1) generating an instruction address for the branch instruction;

(c2) generating a branch target address for the branch instruction; and (c3) enqueueing the branch instruction, the branch instruction address, the branch target address, and the prediction signal for the branch instruction; and, wherein step (d) includes, prior to executing, dequeueing the branch instruction enqueued in step c3.

17. The method of claim 15, further including, before step (d) generating a token for each of said branch instruction in the sequence of instructions and propagating the generated tokens in the execution pipeline; and wherein step (d) is executed in response to the tokens propagating to a predetermined pipeline stage in the execution pipeline.

18. The method of claim 17, wherein first tokens are generated for the branch instructions which only test conditions created by execution of previous instructions and wherein step (d) is executed in response to the first tokens propagating to an address generation stage of the execution pipeline.

19. The method of claim 18, wherein second tokens are generated for the branch instructions which require pipelined execution in the execution pipeline to change the condition signals and wherein step (d) is executed in responses to the second tokens propagating to an execution stage of the execution pipeline, the execution stage following the address generation stage.

* * * * *

UNITED STATES PATENT AND TRADEMARK OFFICE
CERTIFICATE OF CORRECTION

PATENT NO. : 5,287,467

DATED : February 15, 1994

INVENTOR(S) : Blaner et al.

It is certified that error appears in the above-identified patent and that said Letters Patent is hereby corrected as shown below:

Item [56]:
Page 1, References Cited - OTHER PUBLICATIONS

Acosta, R.D. et al., "An Instruction Issuing Approach to Enhancing Performance in Multiple Functional Unit Processors", IEEE Transactions on Computers, C-35 No. 9, September 1986, pp. 815-828.

Anderson, D.W. et al., "The IBM System/360 Model 91: Machine Philosophy and Instruction Handling", IBM Journal, January 1967, pp. 8-24.

Archibold, J. et al., "Cache Coherence Protocols: Evaluation Using a Multi-processor Simulation Model", ACM Transactions on Computer Systems, Vol. 4 No. 4, November 1986, pp. 273-398.

Baer, J.L. et al., "Multi-Level Cache Hierarchies: Organizations, Protocols, and Performance", Journal of Parallel and Distributed Computing, Vol. 6, 1989, pp. 451-476.

Bandyopadhyay, S. et al., "Compiling for the CRISP Microprocessor", Proceedings of Compcon, Spring 1987, pp. 96-100.

Berenbaum, A.D., "Introduction to the CRISP Instruction Set Architecture", Proceedings of Compcon, Spring 1987, pp. 86-89.

Capozzi, A.J. et al., "Non-Sequential High-Performance Processing", IBM Technical Disclosure Bulletin, Vol. 27, No. 5, October 1984, pp. 2842-2844.

Chan, S. et al., "Building Parallelism Into the Instruction Pipeline", High Performance Systems, December 1989, pp. 53-60.

Colwell, R.P. et al., "A VLIW Architecture for a Trace Scheduling Compiler", IEEE Transactions on Computers, Vol. 37, No. 8, August 1988, pp. 967-979.

UNITED STATES PATENT AND TRADEMARK OFFICE
CERTIFICATE OF CORRECTION

PATENT NO.   : 5,287,467

DATED        : February 15, 1994

INVENTOR(S)  : Blaner et al.

It is certified that error appears in the above-identified patent and that said Letters Patent is hereby corrected as shown below:

Page 2, References Cited - OTHER PUBLICATIONS

Ditzel, D.R. et al., "Branch Folding in the CRISP Microprocessor: Reducing Branch Delay to Zero", Proceedings of Compcon, Spring 1987, pp. 2-9.

Eberhard, R.J., "Early Release of a Processor Following Address Translation Prior to Page Access Checking", IBM Technical Disclosure Bulletin, Vol. 33, No. 10A, March 1991, pp. 371-374.

Fisher, J.A., "The VLIW Machine: A Multi-Processor for Compiling Scientific Code", IEEE Computer, July, 1984, pp. 45-53.

Hennessy, J. et al., "MIPS: A VLSI Processor Architecture", Proceedings of the CMU Conference on VLSI Systems and Computations, 1981, pp. 337-346.

Hwu, W.W. et al., "Checkpoint Repair for High-Performance Out-of-Order Execution Machines", IEEE Transactions on Computers, Vol. C-36, No. 12, December 1987, pp. 1496-1514.

Jouppi, N.P. et al., "Available Instruction-Level Parallelism for Superscalar and Superpipelined Machines", ASPLOS-III Proceedings, Boston, MA, 1989, pp. 272-282.

Jouppi, N.P., "The Nonuniform Distribution of Instruction-Level and Machine Parallelism and Its Effect on Performance", IEEE Transactions on Computers, Vol. 38, No. 12, December 1989, pp. 1645-1658.

Kogge, P.M., "The Architecture of Pipelined Computers", Hemisphere Publishing Corporation, 1981.

Lee, J.K.F. et al., "Branch Prediction Strategies and Branch Target Buffer Design", IEEE Computer, Vol. 17, No. 1, January 1984, pp. 6-22.

Murakami, K. et al., "SIMP (Single Instruction Stream/Multiple Instruction Pipelining): A Novel High-Speed Single Processor Architecture", Proceedings of the Sixteenth Annual Symposium on Computer Architecture, 1989, pp. 78-85.

UNITED STATES PATENT AND TRADEMARK OFFICE
CERTIFICATE OF CORRECTION

PATENT NO.    :  5,287,467

DATED         :  February 15, 1994

INVENTOR(S)   :  Blaner et al.

It is certified that error appears in the above-identified patent and that said Letters Patent is hereby corrected as shown below:

Page 3, References Cited - OTHER PUBLICATIONS

Patterson, D.A., "Reduced Instruction Set Computers", Communications of the ACM, Vol. 28, No. 1, January, 1985, pp. 8-21.

Radin, G., "The 801 Minicomputer", IBM J. Res. Develop., Vol. 27, No. 3, May 1983, pp. 237-246.

Riseman, E.M. et al., "The Inhibition of Potential Parallelism by Conditional Jumps", IEEE Transactions on Computers, December 1972, pp. 1405-1411.

Ryan, D.P., "Intel's 80960: An Architecture Optimized for Embedded Control", IEEE Micro, June 1988, pp. 63-76.

Smith, A.J., "Cache Memories", Computing Surveys, Vol. 14, No. 3, September 1982, pp. 473-530.

Smith, J.E., "A Study of Branch Prediction Strategies", IEEE Proceedings of the 8th Annual Symposium on Computer Architecture, May 1981, pp. 135-148.

Smith, J.E. et al., "A Study of Instruction Cache Organizations and Replacement Policies", IEEE Proceedings of 10th Annual International Symposium of Computer Architecture, June 1983, pp. 132-137.

Smith, J.E., "Dynamic Instruction Scheduling and the Astronautics ZS-1", IEEE Computer, July 1989, pp. 21-35.

Smith, M.D. et al., "Limits on Multiple Instruction Issue", ASPLOS III, 1989, pp. 290-302.

Tomasulo, R.M., "An Efficient Algorithm for Exploiting Multiple Arithmetic Units", Computer Structures, Principles and Examples (Siewiorek, et al ed), McGraw-Hill, 1982, pp. 293-305.

Tucker, S.G., "The IBM 3090 System: An Overview", IBM Systems Journal, Vol. 25, No. 1, 1986, pp. 4-19.

UNITED STATES PATENT AND TRADEMARK OFFICE
CERTIFICATE OF CORRECTION

PATENT NO.  : 5,287,467

DATED       : February 15, 1994

INVENTOR(S) : Blaner et al.

It is certified that error appears in the above-identified patent and that said Letters Patent is hereby corrected as shown below:

Page 4, References Cited - OTHER PUBLICATIONS

Vassiliadis, S. et al., "Condition Code Predictor for Fixed-Point Arithmetic Units", Int. J. Electronics, 1989, Vol. 66, No. 6, 1989, pp. 887-890.

Wulf, W.A., "The WM Computer Architecture", Computer Architecture News, Vol. 16, No. 1, March 1988, pp. 70-84.

IBM Publication No. SA22-7200-0, Principles of Operation, IBM Enterprise Systems Architecture/370, 1988.

Signed and Sealed this

Thirteenth Day of December, 1994

Attest:

BRUCE LEHMAN

*Attesting Officer*        *Commissioner of Patents and Trademarks*